US009650573B2

(12) United States Patent
Archetti et al.

(10) Patent No.: US 9,650,573 B2
(45) Date of Patent: May 16, 2017

(54) LIQUID CRYSTALLINE MEDIUM AND LIQUID CRYSTAL DEVICE

(71) Applicant: Merck Patent GmbH, Darmstadt (DE)

(72) Inventors: Graziano Archetti, Darmstadt (DE); Michael Junge, Pfungstadt (DE); Ming-Chou Wu, Zhongli (TW)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/890,733

(22) PCT Filed: Apr. 22, 2014

(86) PCT No.: PCT/EP2014/001070
§ 371 (c)(1),
(2) Date: Nov. 12, 2015

(87) PCT Pub. No.: WO2014/183825
PCT Pub. Date: Nov. 20, 2014

(65) Prior Publication Data
US 2016/0108318 A1   Apr. 21, 2016

(30) Foreign Application Priority Data

May 14, 2013   (EP) .................................... 13002533

(51) Int. Cl.
| | | |
|---|---|---|
| G02F 1/1333 | (2006.01) | |
| C09K 19/60 | (2006.01) | |
| C09K 19/42 | (2006.01) | |
| C09K 19/52 | (2006.01) | |
| C09K 19/56 | (2006.01) | |
| G02F 1/13 | (2006.01) | |
| C09K 19/04 | (2006.01) | |
| C09K 19/30 | (2006.01) | |
| C09K 19/34 | (2006.01) | |

(52) U.S. Cl.
CPC ........ *C09K 19/601* (2013.01); *C09K 19/3003* (2013.01); *C09K 19/3402* (2013.01); *C09K 19/42* (2013.01); *C09K 19/52* (2013.01); *C09K 19/56* (2013.01); *G02F 1/132* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3422* (2013.01)

(58) Field of Classification Search
CPC ...... C09K 19/601; C09K 19/42; C09K 19/52; C09K 19/56; C09K 19/3003; C09K 19/3402; C09K 2019/0466; C09K 2019/3004; C09K 2019/3009; C09K 2019/301; C09K 2019/3016; C09K 2019/3027; C09K 2019/3422; G02F 1/132; G02F 1/1333

USPC ........... 252/299.01, 299.61, 299.62, 299.63, 252/299.6; 349/182
See application file for complete search history.

(56) References Cited

U.S. PATENT DOCUMENTS

| | | |
|---|---|---|
| 5,152,111 A | 10/1992 | Baughman et al. |
| 8,284,336 B2 | 10/2012 | Powers et al. |
| 8,665,414 B2 | 3/2014 | Powers et al. |
| 2008/0198301 A1 | 8/2008 | Jeng et al. |
| 2009/0015902 A1 | 1/2009 | Powers et al. |
| 2009/0167971 A1 | 7/2009 | Powers et al. |
| 2010/0045924 A1 | 2/2010 | Powers et al. |
| 2010/0259698 A1 | 10/2010 | Powers et al. |
| 2013/0033738 A1 | 2/2013 | Powers et al. |
| 2014/0183766 A1 | 7/2014 | Powers et al. |
| 2016/0108318 A1* | 4/2016 | Archetti .................. G02F 1/132 349/182 |

FOREIGN PATENT DOCUMENTS

| | | |
|---|---|---|
| WO | 2010/022294 A2 | 2/2010 |
| WO | 2010/118422 A2 | 10/2010 |
| WO | 2012/100901 A1 | 8/2012 |

OTHER PUBLICATIONS

International Search Report dated Aug. 5, 2014 issued in corresponding PCT/EP2014/001070 application (pp. 1-4).
Wen-Zheng Chen, Yi-Tai Tsai, and Tsung-Hsien Lin, Optics Letters 34, 2545-2547 (2009).†
Wen-Zheng Chen, Yi-Tai Tsai, and Tsung-Hsien Lin, Applied Physics Letters 94, 201114-1-201114-3 (2009).†
Wen-Yu Teng, Shie Chang Jeng, Chia-Wei Kuo, Yan-Rung Lin, Chi-Chang Liao, and Wei-Kuo Chin, Optics Letters 33, 1663-1665 (2008).†

\* cited by examiner
† cited by third party

*Primary Examiner* — Geraldina Visconti
(74) *Attorney, Agent, or Firm* — Millen White Zelano and Branigan, PC; John Sopp; Anthony Zelano

(57) ABSTRACT

The present invention relates a liquid crystalline medium comprising one or more liquid crystalline compounds, one or more dichroic dyes, and one or more compounds capable of promoting or inducing homeotropic alignment to the adjacent liquid crystal medium at a given temperature selected from the group of compounds (A), having a three-dimensional structure, a molecular weight of greater than 450 Da, and one or more anchor groups, or the group of organic compounds (B) having one or more ring groups, and one or more anchor groups.
The invention furthermore relates to a temperature-reactive device for the regulation of light transmission, containing such liquid crystalline medium, and a process for the temperature-dependent control of light transmission through the layer of such liquid-crystalline medium.

27 Claims, 1 Drawing Sheet

LIQUID CRYSTALLINE MEDIUM AND LIQUID CRYSTAL DEVICE

The present invention relates to a liquid crystalline medium comprising one or more liquid crystalline compounds, one or more dichroic dyes, and one or more compounds capable of promoting or inducing homeotropic alignment to the adjacent liquid crystal medium at a given temperature selected from the group of compounds (A), having a three-dimensional structure, a molecular weight of greater than 450 Da, and one or more anchor groups, or the group of organic compounds (B) having one or more ring groups, and one or more anchor groups.

The invention furthermore relates to a temperature-reactive device for the regulation of light transmission, containing such liquid crystalline medium, and a process for the temperature-dependent control of light transmission through the layer of such liquid-crystalline medium.

For the purposes of the present invention, the term "liquid-crystalline medium" is taken to mean a material, which exhibits liquid-crystalline properties under certain conditions. In particular, the term is taken to mean a material, which forms a nematic liquid-crystalline phase under certain conditions. A liquid-crystalline medium may comprise one or more liquid-crystalline compounds and in addition further substances.

The term "liquid-crystalline compound" is taken to mean a compound, which exhibits liquid-crystalline properties under certain conditions, and in particular a compound, that forms a nematic liquid-crystalline phase under certain conditions or that forms a nematic liquid-crystalline phase upon mixing with other liquid-crystalline compounds.

For the purposes of the present application, a "temperature-reactive device" is taken to mean a device, which adopts various states depending on the temperature. An example thereof is a device, which exhibits a varying degree of light transmission depending on the temperature.

The term "alignment" or "orientation" relates to alignment (orientation ordering) of anisotropic units of material such as small molecules or fragments of big molecules in a common direction named "alignment direction". In an aligned layer of liquid-crystalline material the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a large proportion of the liquid-crystalline molecules are oriented substantially parallel (about 180°) to the plane of the layer.

The term "homeotropic orientation/alignment", for example in a layer of an liquid-crystalline material, means that the long molecular axes (in case of calamitic compounds) or the short molecular axes (in case of discotic compounds) of a large proportion of the liquid-crystalline molecules are oriented at an angle θ ("tilt angle") between about 80° to 90° relative to the plane of the layer.

As with the common dyes, a "dichroic dye" absorbs light when exposed to the correct wavelength. The dichroic dye make use of the dichroic absorption: light with polarization along the absorption transition dipole is absorbed while light with polarization perpendicular to the dipole is not absorbed.

For the purpose of this application the compounds capable of promoting or inducing homeotropic alignment to the adjacent liquid crystal medium at a given temperature which are selected from the group of compounds (A), having a three-dimensional structure, a molecular weight of greater than 450 Da, and one or more anchor group, or the group of organic compounds (B) having one or more ring group, and one or more anchor group, are also summarized under the term "self aligning molecules" or "SAM".

Furthermore, the definitions as given in C. Tschierske, G. Pelzl and S. Diele, Angew. Chem. 2004, 116, 6340-6368 shall apply to non-defined terms related to liquid crystal materials in the instant application.

For the purposes of the present application, the term light transmission is taken to mean the passage of electromagnetic radiation in the visible (VIS), near infrared (near-IR, NIR) and UV-A region through the device. The term light in the present application is correspondingly likewise taken to mean electromagnetic radiation in the visible, near infrared and UV-A region of the spectrum. In accordance with physical definitions usually used, UV-A light, visible light and near infrared light together are taken to mean radiation having a wavelength of 320 to 3000 nm.

For the purposes of the present invention, the term compound having a three-dimensional structure is taken to mean a compound which does not extend principally in a linear manner and in only one dimension, such as, for example, a polymer or a small organic molecule, such as, for example, octa-1,7-diyne, n-decane or p-quaterphenyl, and which furthermore does not extend principally in a planar manner and in only two dimensions, such as, for example, benzene or pyrene, but instead which extends substantially equally in all three dimensions of space.

Examples of compounds of this type are tetraphenylmethane, cubane, closo-carbaboranes, such as, for example, $C_2B_{10}H_{12}$, fullerenes and silsesquioxanes. In general, molecular cage compounds, as defined in a following section, are typically compounds having a three-dimensional structure in accordance with the above definition. A compound having a three-dimensional structure can, for example, have an approximately spherical, cuboid, tetrahedral or pyramidal structure.

A compound of this type preferably has a length dimension $d_{max}$ and a further length dimension $d_{min}$, where $d_{max}$ is defined as the greatest dimension and $d_{min}$ is defined as the smallest dimension, and where $d_{min}$ has at least 30% of the value of $d_{max}$, particularly preferably at least 50%, again particularly preferably at least 70% and very particularly preferably at least 80% of the value of $d_{max}$.

The said structural parameters can be determined by simulation methods, known to the person skilled in the art, for the spatial structure of compounds. These generally have sufficient accuracy to enable the person skilled in the art to classify a compound as a compound having a three-dimensional structure in accordance with the above definition. Furthermore, the person skilled in the art, in particular in the case of novel and/or lesser-known classes of structure, can fall back on structural determination by means of crystallography or spectroscopic methods.

With the increasing importance of energy efficiency of buildings, there is a growing demand for devices, which control the transmission of light and thus the energy flow through windows or glass surfaces. In particular, there is a demand for devices which are able to adapt the energy flow through glass surfaces to the conditions (heat, cold, high insolation, low insolation) prevailing at the particular point in time. Of particular interest is the provision of such devices in temperate climatic zones, where a seasonal change takes place from warm outside temperatures combined with high insolation to cold outside temperatures combined with low insolation.

The effects caused by insulation on glass surfaces in buildings will be presented below. Comparable effects may occur not only in the case of buildings, but also in the case of vehicles or transport containers, for example shipping containers.

In warm climatic zones and in temperature climatic zones in the warm season, glass surfaces in buildings result in undesired heating of the interior when they are affected by insolation. This is because glass is transparent to radiation in the VIS or near-IR region of the electromagnetic spectrum. Objects in the interior absorb the radiation that has been allowed through and are warmed thereby, which results in an increase in the room temperature (greenhouse effect). However, the said effect of glass surfaces in buildings is not generally undesired: in the case of low outside temperatures, in particular in cold climatic zones or in the cold season in temperate climatic zones, heating of the interior due to insolation as a consequence of this effect may be advantageous, since the energy demand for space heating is thereby reduced and costs can thus be saved.

One of the main technical objects of the present invention is to provide devices which regulate light transmission through windows or other glass surfaces, preferably, to provide devices which adapt the regulation of light transmission automatically to the prevailing conditions, as explained above (smart windows), more preferably, to provide devices which work energy-efficiently, can be installed with the lowest possible technical effort, are technically reliable and meet aesthetic demands. Examples of the latter aspect, which may be mentioned, are highly regular switching of the device and avoidance of colour or pattern effects.

The prior art discloses devices which can be switched reversibly from a transparent state to a less light-transparent state, for example an opaque (light-scattering) or dark-transparent state, on application of an electrical voltage (for example C. M. Lampert et al., Solar Energy Materials & Solar Cells, 2003, 489-499).

However, electrically switchable devices like the devices mentioned above have the disadvantage that they cannot be adapted immediately and automatically to the ambient conditions. Furthermore, they require electrical connections, which is associated with increased effort during installation and an increased need for maintenance.

US 2009/0015902 and US 2009/0167971 disclose temperature-reactive devices, which contain a liquid-crystalline medium in a layer between two polarisers. The switching between a state of relatively high light transmission and a state of relatively low light transmission is achieved by a phase transition of the liquid-crystalline medium from a nematic state to an isotropic state. Due to the phase transition, an abrupt transition occurs here between the state of high light transmission and the state of relatively low light transmission. It may occur here that the state of high light transmission exists over the entire surface of the device, considered in a few areas, while the state of low light transmission exists at the same time in other, adjacent areas.

WO 2012/100901 A1 discloses a temperature-reactive device for the regulation of light transmission, containing a liquid-crystalline medium and a component (N) comprising silsesquioxanes, which promotes or induces vertical alignment with respect to substrate main plane. The invention also relates to a process for the temperature-dependent control of light transmission through a layer of a liquid-crystalline medium. However, the use of organic compounds in order to promote such homeotropic alignment according to the present invention is neither disclosed nor suggested.

WO 2011/004340 A1 discloses a liquid-crystalline media (LC media) having negative or positive dielectric anisotropy comprising self-aligning mesogens, which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers.

S.-C. Jeng et al., Optics Letters 2009, 34, 455-457, discloses that certain liquid-crystalline compounds spontaneously align homeotropically (vertically) in the presence of polyhedral oligomeric silsesquioxanes (silsesquioxanes, PSSs). The degree of vertical alignment can be influenced here by the concentration of silsesquioxanes. Furthermore, a use of the mixtures comprising liquid-crystalline compounds and silsesquioxanes in LC displays based on VA technology (VA technology=vertical alignment) is disclosed in which reversible rotation of the liquid-crystalline compounds out of the vertical arrangement takes place by application of an electric field. Comparable applications are furthermore disclosed in US 2008/0198301 and in S.-C. Jeng et al., Appl. Phys. Lett. 2007, 91, 0611121-0611123.

Additionally, US 2010/0259698 A1 discloses thermochromic filters, which are constructed using absorptive, reflective, or fluorescent dyes, molecules, polymers, particles, rods, or other orientation-dependent colorants that have their orientation, order, or director influenced by carrier materials, which are themselves influenced by temperature. These order-influencing carrier materials include thermotropic liquid crystals, which provide orientation to dyes and polymers in a Guest-Host system in the liquid-crystalline state at lower temperatures, but do not provide such order in the isotropic state at higher temperatures. The varying degree to which the absorptive, reflective, or fluorescent particles interact with light in the two states can be exploited to make many varieties of thermochromic filters. The disclosed thermochromic filters are suitable for controlling the flow of light and radiant heat through selective reflection, transmission, absorption, and/or re-emission. The filters have particular application in passive or active light-regulating and temperature-regulating films, materials, and devices, and particularly as construction materials and building and vehicle surfaces.

However, it can be summarized that there is a considerable demand for temperature-reactive devices suitable for the regulation of light transmission through windows or generally light-transparent surfaces. In particular, there is a demand for devices in which the switching process is based on alternative principles. In particular again, there is a demand for devices in which the switching process does not proceed abruptly, but instead gradually via intermediate values of the transmission.

In addition, modern temperature-reactive devices have to fulfill a number of requirements, which are amongst others,
a high efficiency over a prolonged period of use,
a high stability against solar irradiation, especially UV radiation,
a favourable adaption of the energy flow through glass surfaces to the ambient temperature conditions,
a high durability in an environment where it is externally exposed especially regarding cold and heat,
the method of production has to be cost efficient and suitable for a mass production process.

In view of the prior art and all above-mentioned requirements on such materials, there is a considerable demand for new or alternative devices, which preferably do not show the drawbacks of the temperature reactive devices of prior art or even if do so, preferably to a less extent.

Surprisingly, the inventors have found that temperature-reactive devices, containing a layer of a liquid-crystalline medium, which comprises one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups, represent excellent alternatives to already known temperature reactive devices of prior art, and preferably, improve one or more of the above-mentioned requirements in view of the prior art, or more preferably, fulfill all above-mentioned requirements at the same time.

Thus, the present invention relates to a liquid crystalline medium comprising, one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups.

In accordance with the invention, the liquid crystalline medium comprises one or more compounds (A) having a three-dimensional structure and a molecular weight of greater than 450 Da.

In accordance with the invention, the compound (A) is dissolved or dispersed in the liquid-crystalline medium. Compound (A) is preferably dispersed in the liquid-crystalline medium.

Compound (A) is preferably chemically inert, aging-resistant and lipophilic and compatible with the liquid-crystalline compounds present in the liquid-crystalline medium. For the purposes of the present invention, compatibility is taken to mean, in particular, that compound (A) does not undergo any chemical reactions with the compounds which impair the functioning of the device.

In a preferred embodiment of the invention, compound (A) is selected from nanoparticles. The nanoparticles can be, for example, metal nanoparticles, metal-oxide nanoparticles or clusters.

For the purposes of the present application, the term nanoparticle is taken to mean a particle having a diameter between 1 nm and 1 μm.

The nanoparticles preferably have a diameter of 1 nm to 100 nm, particularly preferably a diameter of 1 nm to 50 nm, more preferably 1 nm to 10 nm and even more preferably 1 nm to 5 nm. It is furthermore preferred for the particles to have a side ratio $d_{max}/d_{min}$ of at most 3:1, preferably at most 2:1. $d_{max}$ here denotes the maximum length dimension and $d_{min}$ denotes the minimum length dimension of the particle. The size and shape of the nanoparticles can be determined, for example, by scattering methods in solution or by transmission electron microscopy (TEM).

The nanoparticles used may be identical or different in shape, size and structure.

In a preferred embodiment of the invention, the nanoparticles contain one or more anchor groups $A^1$. This is preferably an organic chemical group. The anchor group $A^1$ is furthermore preferably a group which undergoes a non-covalent interaction with glass or metal-oxide surfaces. A surface of this type can be, for example, the surface of the substrate layer of the device.

Suitable anchor groups $A^1$ are polar groups including groups with atoms selected from N, O, S and P, which are preferably at the same time stable to air and water. One or more, preferably two or more, of these heteroatoms are preferably present in the anchor group $A^1$.

The anchor group $A^1$ particularly preferably consists of at least two separate structural elements which contain heteroatoms selected from N and O, where N is preferred, and furthermore of one or more covalent, linking structure between the said structural elements and optionally between one or more of the structural elements and the bonding site of the anchor group $A^1$.

The said covalent structure consists of chain-form or cyclic aliphatic radicals and/or aromatic rings, preferably of saturated hydrocarbon chains and/or aliphatic rings. Aliphatic rings include, for example, cyclohexane and cyclopentane.

The anchor group $A^1$ is preferably a group of the following formula A-1:

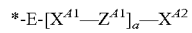

$$*\text{-E-}[X^{A1}\text{—}Z^{A1}]_a\text{—}X^{A2} \qquad \text{A-1,}$$

in which, in each case independently,

E represents a single bond or any desired spacer group;)

$X^{A1}$ is selected from —NH—, —NR$^{A1}$—, —O— and a single bond;

$X^{A2}$ is selected from —NH$_2$, —NHR$^{A1}$, NR$^{A1}{}_2$, —OR$^{A1}$ and —OH;

$Z^{A1}$ is selected from an alkylene group having 1-15 C atoms, a carbocyclic ring group having 5 or 6 C atoms, or combinations of such groups, where the groups may in each case be substituted by OH, OR$^{A1}$, —NH$_2$, —NHR$^{A1}$, —NR$^{A1}{}_2$ or halogen;

$R^{A1}$ is selected on each occurrence, identically or differently, from H, D, or an aliphatic, aromatic and/or heteroaromatic organic group having 1 to 30 C atoms, in which, in addition, one or more H atoms may be replaced by D or F;

a is equal to 0, 1, 2 or 3, preferably 1 or 2, very particularly preferably 1; and

* marks the bonding site of the anchor group.

The general designations of organic radicals used for the purposes of the present application are explained below. The specific embodiments mentioned are preferred in accordance with the invention.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, more preferably 1,4-phenylene, 4,4'-biphenylene, 1,4-terphenylene.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3- oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzoimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydro-cyclopenta[a]phenanthrene, optionally being substituted by one or more identical or different groups L, Especially preferred aryl-, heteroaryl-, alicyclic- and heterocyclic groups are 1,4-phenylene, 4,4'-biphenylene, 1,4-terphenylene, 1,4-cyclohexylene, 4,4'-bicyclohexylene, and 3,17-hexadecahydro-cyclopenta[a]phenanthrene, optionally being substituted by one or more identical or different groups L.

Preferred substituents of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile.

Particularly preferred substituents are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$.

Above and below "halogen" denotes F, Cl, Br or I.

Above and below, the terms "alkyl", "aryl", "heteroaryl", etc., also encompass polyvalent groups, for example alkylene, arylene, heteroarylene, etc. The term "aryl" denotes an aromatic carbon group or a group derived there from. The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pentynyl, hexynyl, octynyl.

Preferred amino groups are, for example, dimethylamino, methylamino, methylphenylamino, phenylamino.

In a preferred embodiment of the invention, the group E is a single bond or a spacer group selected from an alkylene group having 1 to 20 C atoms, which is optionally substituted by radicals selected from F, Cl, Br, I and CN, where one or more $CH_2$ groups in the alkylene group may each be replaced, independently of one another, by —O—, —S—, —NH—, —N($R^{41}$)—, —Si(($R^{41}$)$_2$)—, —CO—, —CO—O—, —O—CO—, —O—CO—O—, —S—CO—, —CO—S—, —N($R^{41}$)—CO—O—, —O—CO—N($R^{41}$)—, —N($R^{41}$)—CO—N($R^{41}$)—, —CH=CH— or —C≡C—.

E particularly preferably represents a single bond or a group selected from —$(CH_2)_b$—, —$(CH_2)_b$—O—, —$(CH_2)_b$—O—CO— and —$(CH_2)_b$—O—CO—O—, where b represents an integer from 1 to 20, preferably from 1 to 10.

$R^{41}$ is preferably selected from an alkyl or alkoxy group having 1 to 15 C atoms, which is optionally substituted by D and/or halogen, or an alkenyl, alkynyl, alkenyloxy or alkynyloxy group having 2 to 15 C atoms, which is optionally substituted by D and/or halogen, and an aryl or heteroaryl group having 5 to 18 aromatic ring atoms, which is optionally substituted by D and/or halogen, and combinations of the said groups.

$R^{41}$ is particularly preferably selected from an alkyl or alkenyl group having at most 15 C atoms, which is optionally substituted by D, phenyl and/or halogen.

The anchor group $A^1$ is particularly preferably a group of the following formula A-2:

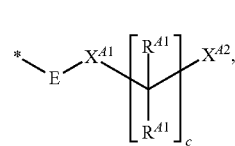

A-2 where E, $X^{A1}$, $X^{A2}$ and $R^{A1}$ are as defined above and c has a value of 1 to 10, preferably 1 to 5, particularly preferably 1 to 3. $R^{A1}$ here is preferably selected from the preferred groups mentioned above.

In a further preferred embodiment of the invention, the nanoparticles contain no anchor groups $A^1$. In this case, they are preferably functionalised by means of other chemical groups, which are preferably non-polar, for example optionally substituted alkyl, alkoxy, alkylthio, alkenyl, alkenyloxy, alkenylthio, alkynyl, alkynyloxy, alkynylthio, aryl, aryloxy, arylthio, aralkyl, heteroaryl, heteroaryloxy, heteroarylthio and heteroaralkyl groups. The groups preferably have at most 20 C atoms, particularly preferably at most 10 C atoms.

In a further preferred embodiment of the invention, the compounds (A) have a three-dimensional structure and a molecular weight of greater than 450 Da. In a preferred embodiment of the invention, the molecular weight of the compounds (A) is greater than 500 Da, particularly preferably greater than 600 Da and very particularly preferably greater than 700 Da. The compounds (A) are preferably molecular compounds. Preference is furthermore given, inter alia, to the preferred embodiments mentioned above under the definition of the term "compound having a three-dimensional structure" relating to the ratio of maximum to minimum dimension of the compounds.

In a preferred embodiment, the compounds (A) contain one or more anchor groups $A^1$.

In a preferred embodiment of the invention, the liquid crystalline medium comprises a single compound (A). In an alternative, likewise preferred embodiment of the invention, the liquid crystalline medium comprises a plurality of different compounds (A), preferably 2, 3, 4 or 5, particularly preferably 2 or 3, different compounds (A).

Compounds (A) are particularly preferably selected from molecular cage compounds. Alternatively, however, the compounds may also be selected from tetra-substituted methane derivatives.

In a preferred embodiment of the invention, the liquid crystalline medium comprises one or more compounds (A) having a three-dimensional structure and a molecular weight of greater than 450 Da, which are molecular cage compounds.

For the purposes of the present application, a molecular cage compound is taken to mean a polycyclic molecular compound whose atoms and chemical bonds form a three-dimensional closed structure (cage).

In a particularly preferred embodiment of the invention, the molecular cage compound is a fullerene derivative, a borane derivative, a carbaborane derivative, a silsesquioxane derivative, a cubane derivative or a tetrahedrane derivative. The molecular cage compound is very particularly preferably a silsesquioxane derivative.

In a particularly preferred embodiment of the invention, the liquid crystalline medium comprises one or more compounds (A) having a three-dimensional structure and a molecular weight of greater than 450 Da, which are silsesquioxane derivatives.

Preferred silsesquioxane derivatives in accordance with the present invention have the general structure N-1:

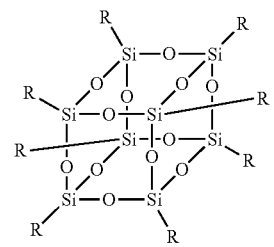

N-1 where
R on each occurrence, identically or differently, represents an anchor group $A^1$ or a radical $R^{A1}$ which, as defined above, is selected on each occurrence, identically or differently, from H, D, or an aliphatic, aromatic and/or heteroaromatic organic radical having 1 to 30 C atoms, in which, in addition, one or more H atoms may be replaced by D or F.

Preferably, one, two or three groups R are an anchor group $A^1$. Particularly preferably, one or two groups R, and very particularly preferably precisely one group R, are an anchor group $A^1$.

The anchor groups $A^1$ are as defined above. The anchor groups $A^1$ are preferably selected from the preferred embodiments as indicated above.

If the substrate layer of the temperature reactive device, which will be described in more detail below, is a metal-oxide layer, for example ITO, or a glass layer, one or more anchor group $A^1$ which contains N and/or O atoms is preferably present, for example as a constituent of an amino, hydroxyl and/or ether group.

However, it may also be preferred in accordance with the invention that no anchor group $A^1$ is present in the compounds.

R is furthermore preferably selected from an alkyl or alkoxy group having 1 to 15 C atoms, which is optionally substituted by D and/or halogen, or an alkenyl, alkynyl, alkenyloxy or alkynyloxy group having 2 to 15 C atoms, which is optionally substituted by D and/or halogen, or an aryl or heteroaryl group having 5 to 18 aromatic ring atoms, which is optionally substituted by D and/or halogen, or combinations of the said groups.

R is particularly preferably selected from an alkyl or alkenyl group having at most 15 C atoms, which is optionally substituted by D, phenyl and/or halogen.

Particularly preferred embodiments of the molecular cage compounds for use in accordance with the invention are the silsesquioxane derivatives indicated below.

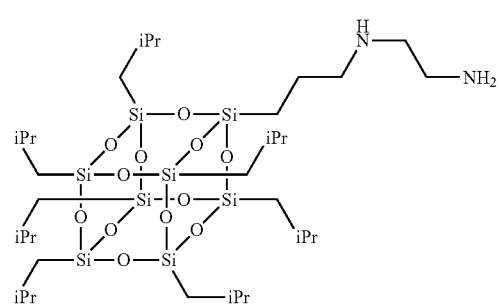

N-2

-continued

N-3
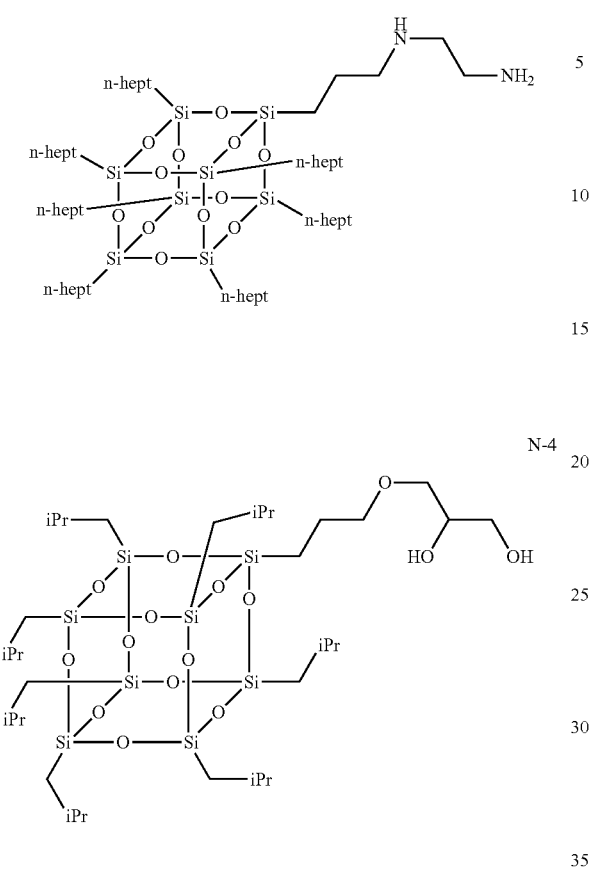

N-4

N-5

N-6

-continued

N-7
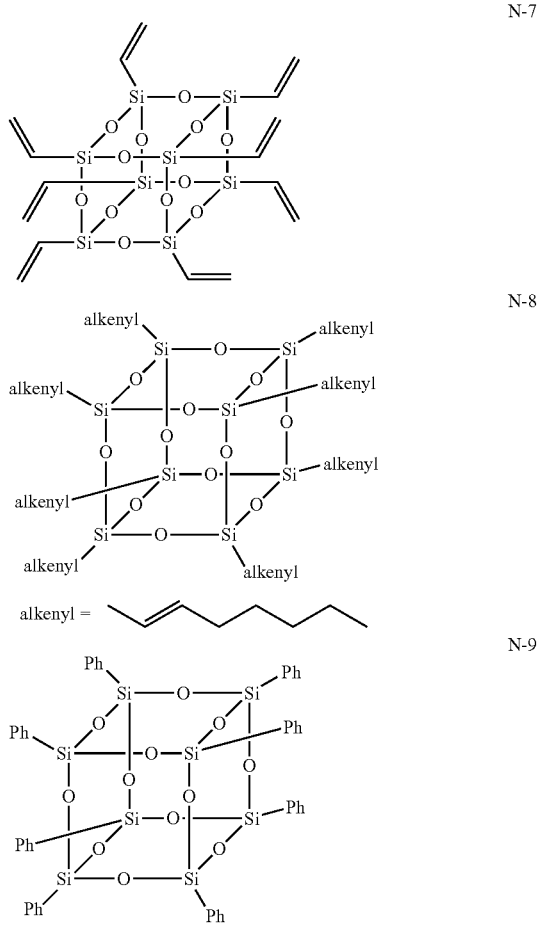

N-8

N-9

Further examples of molecular cage compounds in accordance with the present invention are dimers or oligomers of silsesquioxanes, which have been functionalised by an anchor group on each silsesquioxane unit. A plurality of silsesquioxane units may be connected via the organic radicals bonded at the corners to form dimers or oligomers.

Compound (A) is preferably employed in the liquid-crystalline medium in a concentration of 50 to 0.01% by weight, particularly preferably 30 to 0.1% by weight and very particularly preferably 10 to 0.1% by weight. The concentration of Compound (A) is even more preferably between 5 and 0.1% by weight.

In another preferred embodiment, the liquid-crystalline medium comprises, instead or in addition to the compounds (A), one or more organic compounds (B) having one or more ring groups and one or more anchor groups.

Preferably the compounds (B) are selected from the group of compounds of formula B-I, $$R^{B1}\text{-}A^{B1}\text{-}(Z^{B1}\text{-}A^{B2})_m\text{-}R^{B2} \quad \text{B-I,}$$

wherein, $A^{B1}$ and $A^{B2}$ each, independently of one another, denote an aromatic, heteroaromatic, alicyclic or heterocyclic group, which may also contain fused rings, and which may also be mono- or polysubstituted by a group L, L in each case, independently of one another, denotes OH, $(CH_2)_n$—OH, F, Cl, Br, I, CN, —$NO_2$, —NCO, —NCS, OCN, SCN, —C(=O)N($R^0$)$_2$, C(=O)$R^0$, —N($R^0$)$_2$, —$(CH_2)_n$—N($R^0$)$_2$, optionally substituted silyl, optionally substituted aryl or cycloalkyl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $Z^{B1}$ in each case, independently of one another, denotes —O—, —S—, —CO—, CO—O—, OCO—, —O—CO—O—, OCH$_2$—, CH$_2$O—, SCH$_2$, —CH$_2$S—, CF$_2$O—, OCF$_2$—, CF$_2$S—, —SCF$_2$—, (CH$_2$)$_n$—, CF$_2$CH$_2$—, CH$_2$CF$_2$—, (CF$_2$)$_n$—, CH=CH—, CF=CF—, C≡C—, CH=CH—COO—, OCO—CH=CH—, CR$^0$R$^{00}$ or a single bond, $R^0$ and $R^{00}$ each, independently of one another, denote H or alkyl having 1 to 12 C atoms, $R^{B1}$ denotes H, halogen, straight-chain, branched or cyclic alkyl group or aryl group having 1 to 25 C atoms, in which, in addition, one or more non-adjacent CH$_2$ groups may be replaced by —NR$^0$—, —O—, —S—, —CO—, CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl, $R^{B2}$ denotes, a straight-chain, branched or cyclic alkyl group or aryl group having 1 to 25 C atoms, in which, in addition, one or more non-adjacent CH$_2$ groups may be replaced by —NR$^0$—, —O—, —S—, —CO—, CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl, with the proviso that the radical $R^{B2}$ contains one or more heteroatoms selected from N, S and/or O, m denotes 0, 1, 2, 3, 4 or 5, and n denotes 1, 2, 3 or 4.

In another preferred embodiment of the present invention, the compounds of formula B-I are selected from the group of compounds wherein the group $R^{B2}$ denotes CG,

  CG wherein,

Sp denotes a spacer group or a single bond, $X^{B1}$ in each case independently denotes —NH—, —NR$^0$—, —O— or a single bond, $X^{B2}$ denotes a group —NH$_2$, —NHR$^0$, —NR$^0{}_2$, —OR$^0$, —OH, —(CO)OH or a group of the formula

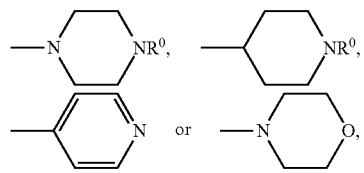

$Z^{B2}$ in each case independently denotes an alkylene group having 1-15 C atoms, a carbocyclic ring having 5 or 6 C atoms, or combinations of one or more rings and one or more alkylene groups, in each of which hydrogen may be replaced by —OH, —OR$^0$, —(CO)OH, —NH$_2$, —NHR$^0$, —NR$^0{}_2$ and/or halogen, $R^0$ has in each occurrence, each and independently one of meanings as indicated under formula B-I, and k denotes 0, 1, 2 or 3.

In another preferred embodiment of the present invention, the compounds of formula B-I are selected from the group of compounds wherein the group $R^{B2}$ denotes CG-I, Sp-X$^{B3}$ CG-I Sp denotes —(CH$_2$)$_p$—, p denotes 0, 1 or 2 and $X^{B3}$ denotes a group —NH$_2$, —SH, —OH, —(CO)OH or a group of the formulae

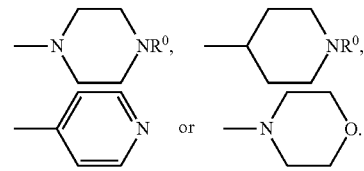

Even more preferably, the compounds (B) are selected from the group of compounds of the following formulae,

  B-Ia

  B-Ib

  B-Ic

  B-Id in which, the groups $R^{B1}$, $A^{B1}$, $A^{B2}$, $Z^{B1}$ and parameter m have one of the meanings as indicated under formula I.

Even more preferably, the compounds of formula B-I are selected from the group of compounds B-Ia to B-Id in which m denotes 0.

Especially preferred compounds are the compounds of formula B-I selected from formulae B-Ia and B-Ic, such as

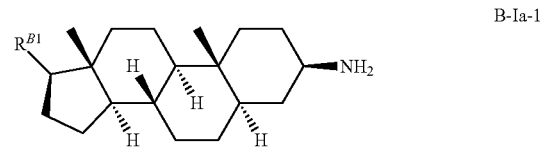  B-Ia-1

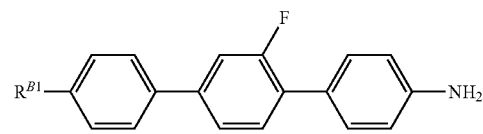  B-Ia-2

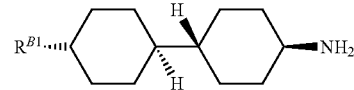  B-Ia-3

  B-Ia-4

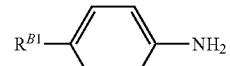  B-Ia-5

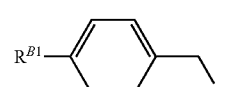  B-Ia-6

-continued

B-Ia-7
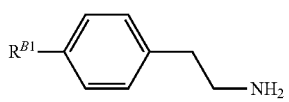

B-Ia-8
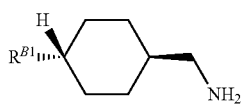

B-Ia-9
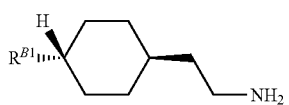

B-Ia-10

B-Ic-1
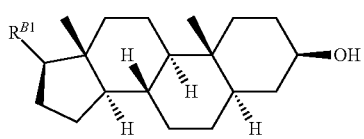

B-Ic-2
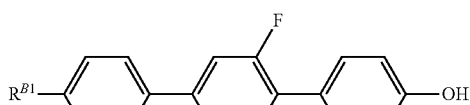

B-Ic-3
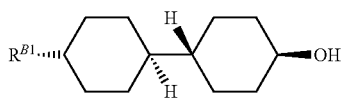

B-Ic-4
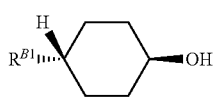

-continued

B-Ic-5

B-Ic-6
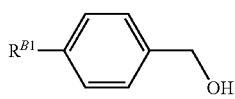

B-Ic-7
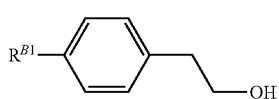

B-Ic-8
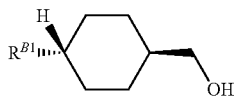

B-Ic-9
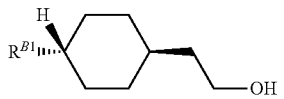

B-Ic-10

in which $R^{B1}$ is a straight chain or branched alkyl, having 1 to 25 C atoms.

In particular preferred are the compounds of formula B-Ic-3 to B-Ic-6.

Compound (B) is preferably employed in the liquid-crystalline medium in a concentration of 50 to 0.01% by weight, particularly preferably 30 to 0.1% by weight and very particularly preferably 10 to 0.1% by weight. The concentration of Compound (B) is even more preferably between 5 and 0.1% by weight.

The medium according to the present invention additionally comprises one or more dichroic dyes.

Preferably, the dichroic dyes are selected from the group of perylene dyes, anthrachinone dyes, and/or azo dyes.

More preferably, the dichroic dyes are selected from the group of compounds of formula I,

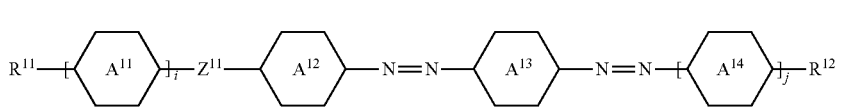    I wherein,

to

are at each occurrence, identically or differently, selected from

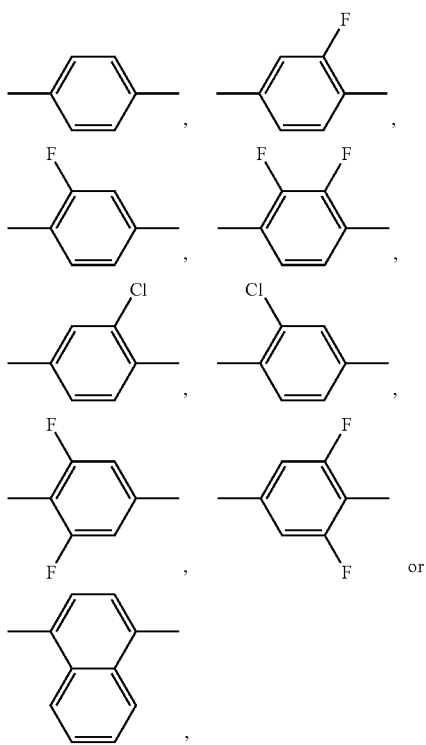

and, in case i is 2 or more, the terminal one of group

may also be

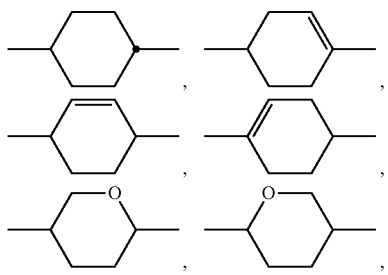

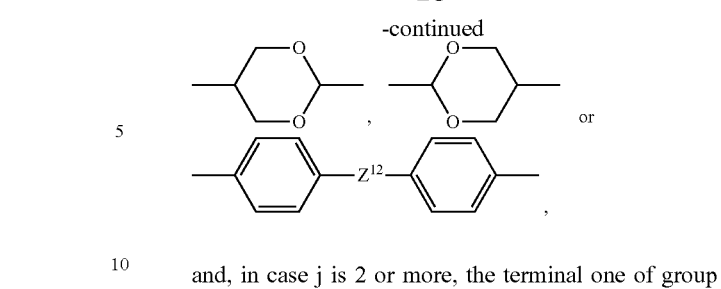

and, in case j is 2 or more, the terminal one of group

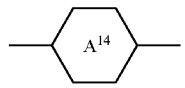

may also be

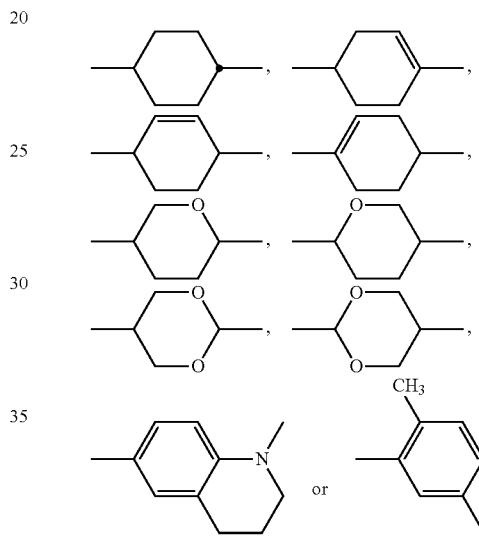

$Z^{11}$ and $Z^{12}$ are, independently of each other, —N=N—, —OCO— or —COO—, $R^{11}$ and $R^{12}$ are, independently of each other, alkyl, alkoxy, fluorinated alkyl or fluorinated alkoxy, alkenyl, alkenyloxy, alkoxyalkyl or fluorinated alkenyl, alkylaminyl, dialkylaminy, alkylcarbonyl, alkyloxycarbonyl, alkylcarbonyloxy, alkyloxycarbonyloxy or alkylcyclohexylalkyl, and i and j are independently of each other 1, 2, 3 or 4.

In a preferred embodiment of the present invention, the liquid crystalline medium comprises one or more dichroic dyes preferably selected from the group of compounds of formulae I-1 to I-7,

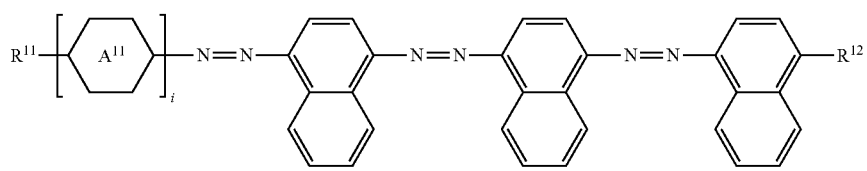

I-1

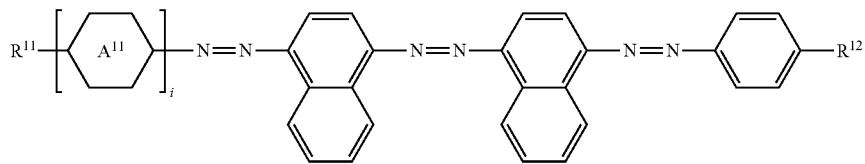
I-2
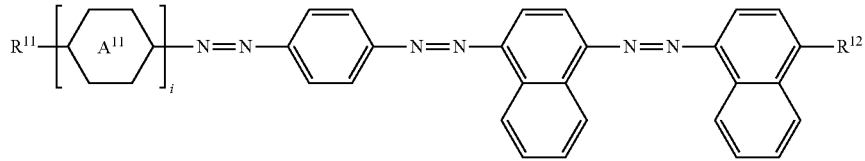
I-3
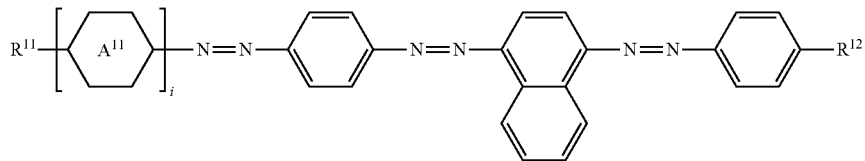
I-4
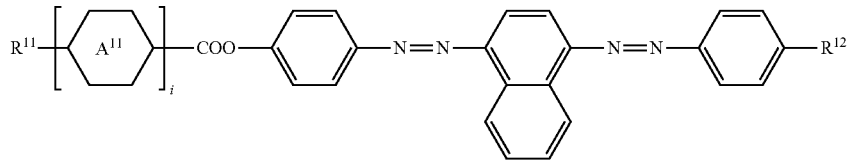
I-5
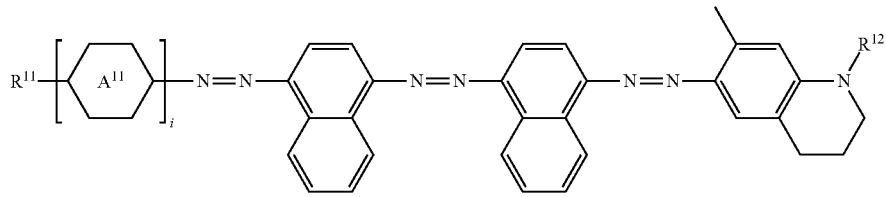
I-6
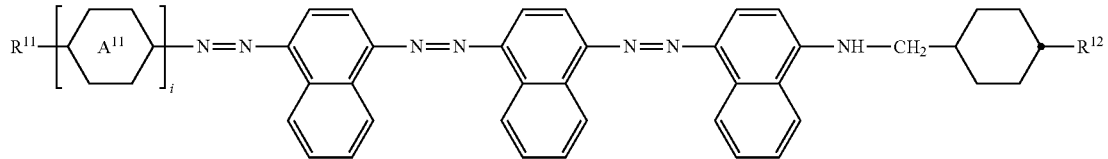
I-7
wherein the parameters have the respective meanings given under formula I above.
In a preferred embodiment of the present invention, the liquid crystalline medium comprises one or more dichroic dyes preferably selected from the group of compounds of formulae I'-1 to I'-7
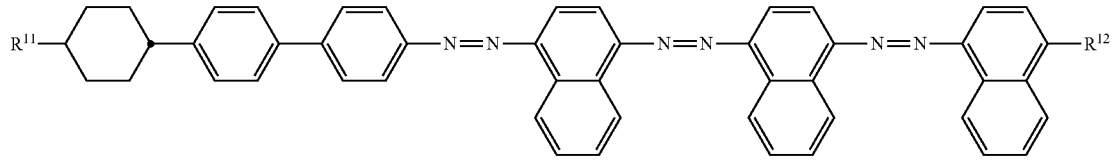
I'-1

I'-2
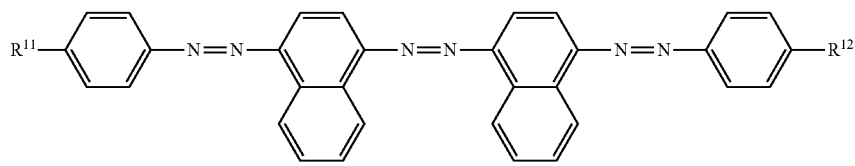
I'-3
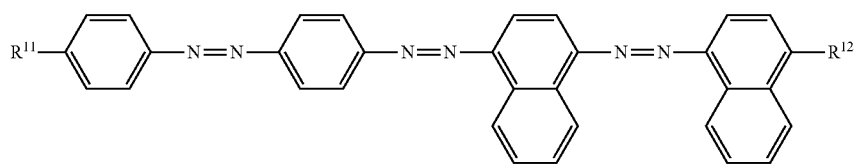
I'-4
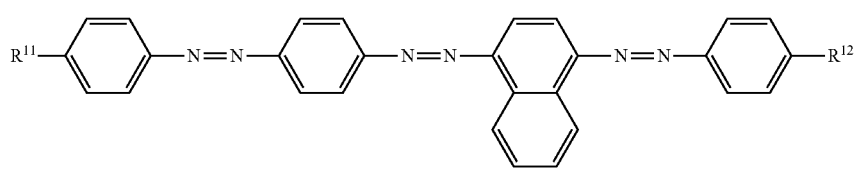
I'-5
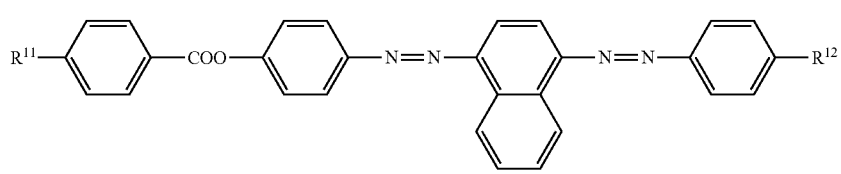
I'-6
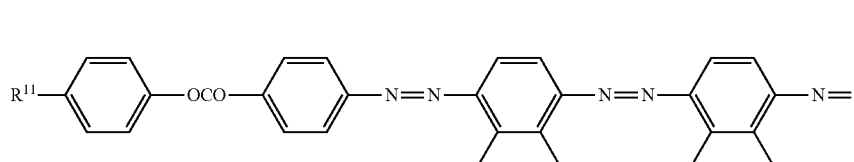
I'-7
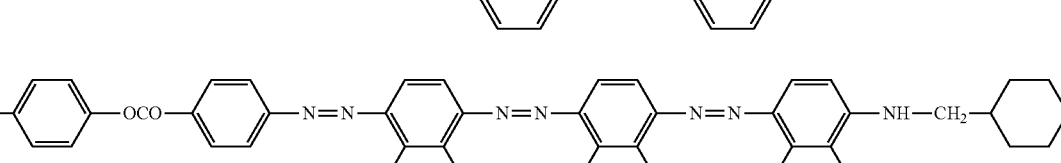
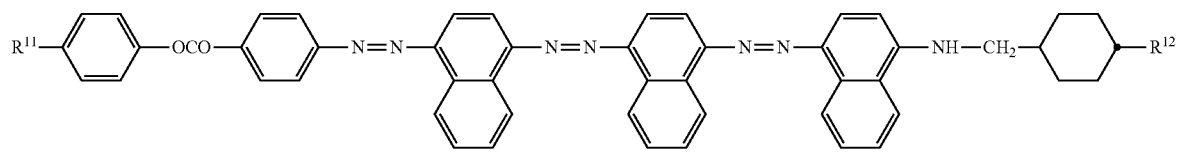
wherein the parameters have the respective meanings given under formula I above.
Further preferred compounds of formula I are represented by the following formulae
I'-1a
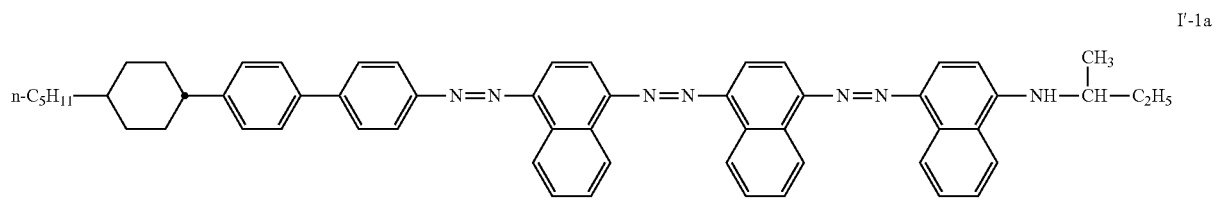
I'-4a
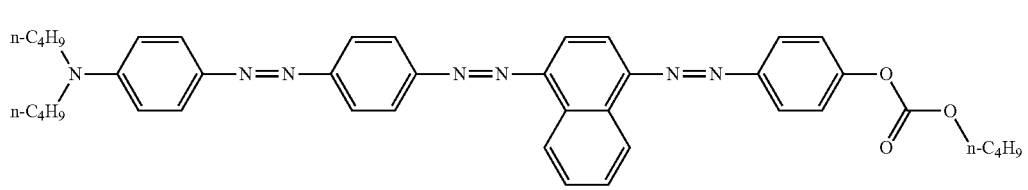

-continued

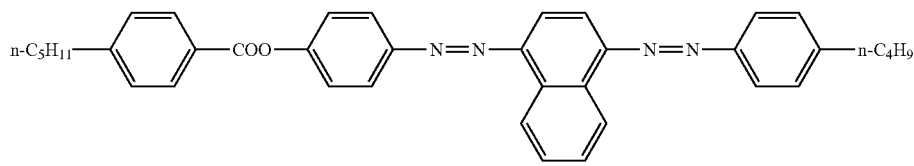

I'-5a

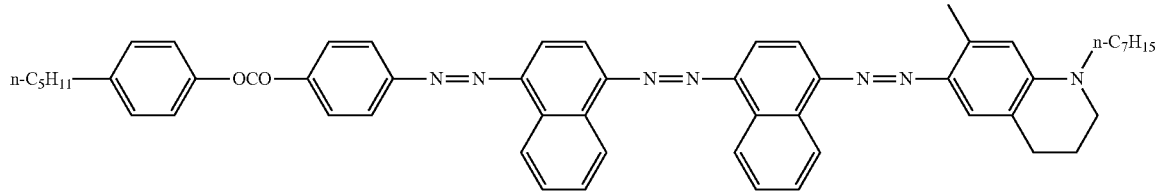

I'-6a

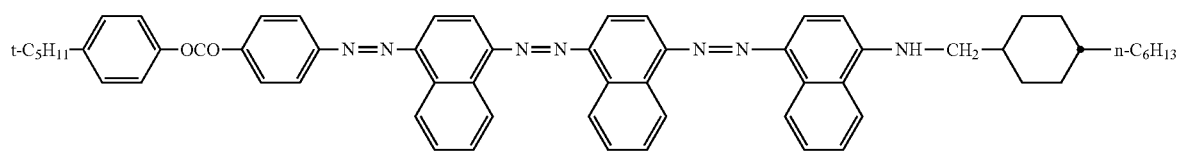

I'-7a

Preferably the concentration of the dichroic dyes in the medium is in the range from 0.1% to 5%, more preferably from 0.2% to 4%, even more preferably from 0.3% to 3%, most preferably from 0.5% to 2% and in particular about 1%.

In a preferred embodiment, the medium comprises a mixture of two or more, preferably of three or more dichroic dyes. Most preferably three dichroic dyes are at present. Preferably, the dichroic dyes have mutually complementing absorption spectra to each other, i. e. complementary absorption colours and are preferably mixed in a ratio relative to each other which results in a neutral colour of the combined absorption of the mixture, i.e. in a black appearance. This means that the absorption is almost constant over the visible spectral range.

For example, the spectral characteristic of a preferred combination of three compounds I'-1a, I'-4a and I'-5a are given in the following table:

| Dye | No. | I'-1a | I'-4a | I'-5a |
|---|---|---|---|---|
|  |  | F593 | F355 | F357 |
|  |  | ME-1107 | ME-301 | ME-540 |
| Absorption Spectrum in $CH_2Cl_2$ (1/100,000) |  |  |  |  |
| $\lambda_{max}$ | /nm | 621 | 536 | 426 |
| $\Delta\lambda_{max}$ | /nm | ±2 | ±2 | ±2 |
| OD* |  | 0.620 | 0.785 | 0.520 |
| ΔOD* |  | ±0.020 | ±0.020 | ±0.020 |
| Colour |  | Blue | Red | Yellow (Orange) |
| Dichroic Properties |  |  |  |  |
| Host LC§ | No. ZLI- | 2903 | 2452 |  |
| DR** |  | 16.2 | 13.7 | 13.0 |
| S*** |  | 0.83 | 0.81 | 0.80 |

*Optical Density: OD = $\log_{10}$ ($I_i/I_t$),
Ii = Intensity of incident light,
It = Intensity of transmitted light,
§ZLI-mixtures available from Merck KGaA, Germany,
**Dichroic Ratio of Dye in Host LC and
***Order Parameter of Dye in Host LC.

The liquid-crystalline medium in accordance with the present invention comprises one or more, preferably at least 3, particularly preferably at least 4 and very particularly preferably at least 5, different liquid-crystalline compounds. If only one liquid crystalline compound is employed, a typical concentration ranges from about 80 to 99% by weight of the total mixture.

The liquid-crystalline medium in accordance with the present invention optionally comprises further compounds, for example stabilisers and/or chiral dopants. Compounds of this type are known to the person skilled in the art. They are preferably employed in a concentration of 0% to 30%, particularly preferably 0.1% to 20%, and very particularly preferably 0.1% to 10%.

In accordance with the invention, the liquid-crystalline medium can have positive dielectric anisotropy Δε. In this case, Δε preferably has a value of ≥1.5.

In accordance with the invention, the liquid-crystalline medium can have negative dielectric anisotropy Δε. In this case, Δε preferably has a value of ≤−1.5.

In accordance with the invention, the liquid-crystalline medium can furthermore have a low positive or negative dielectric anisotropy Δε. In this case, the following preferably applies to Δε: −1.5<Δε<1.5. The present invention likewise relates to a liquid-crystalline medium of this type. In this case, the following particularly preferably applies: −1.0<Δε<1.0.

Δε is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\in$ is defined as $(\in_{\|}-\in_{\perp})$, while $\in_{ave}$. is $(\in_{\|}+2\in_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

The liquid-crystalline medium preferably has a nematic phase in a temperature range from 0° C. to 50° C. The liquid-crystalline medium particularly preferably has a nematic phase in the range from −20° C. to 80° C., even more preferably in the range from −40° C. to 100° C.

In accordance with the invention, the liquid-crystalline medium can comprise any desired liquid-crystalline compounds, with the proviso that compounds of formula I are excluded.

The liquid-crystalline medium preferably comprises one or more compounds of formula II, which is mandatorily different from the compounds of formula B-I,

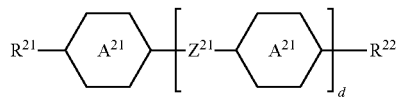

II where
R$^{21}$ and R$^{22}$ on each occurrence, identically or differently, represent F, Cl, —CN, —NCS, —SCN, R$^{23}$—O—CO—, R$^{23}$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more non terminal CH$_2$ groups may be replaced by O or S; and
R$^{23}$ on each occurrence, identically or differently, represents an alkyl group having 1 to 10 C atoms, in which one or more hydrogen atoms may be replaced by F or Cl, and in which one or more non terminal CH$_2$ groups may be replaced by O or S; and

is selected on each occurrence, identically or differently, from

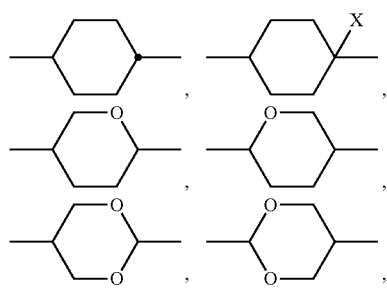

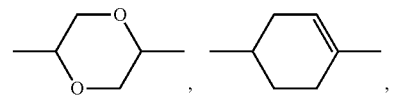
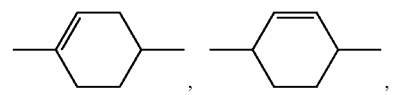
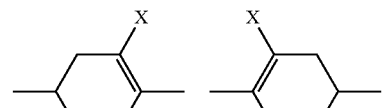
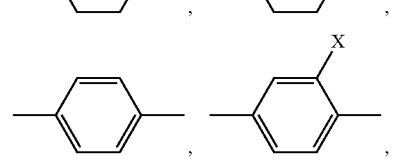
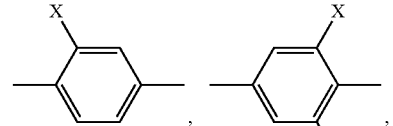
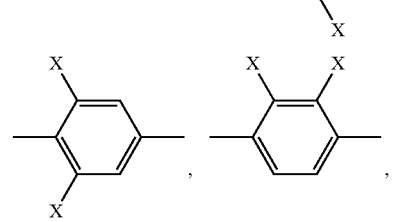
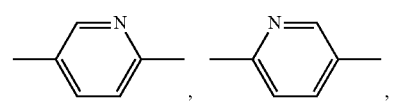
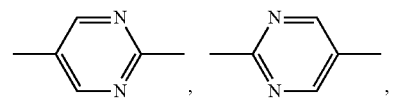
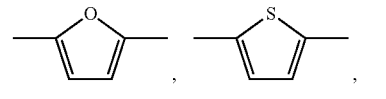
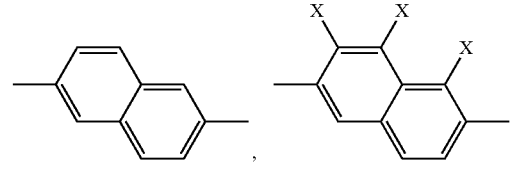
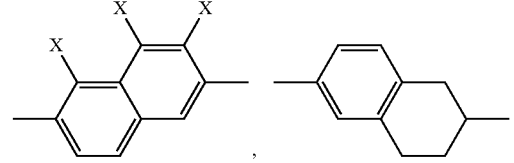
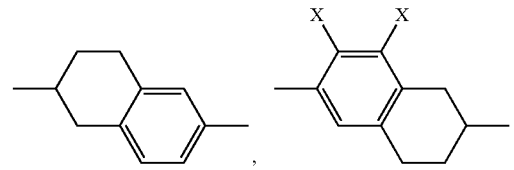

-continued

[chemical structures]

, and where
X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more $CH_2$ groups in the above-mentioned groups may be replaced by O or S; and
$Z^{21}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— and a single bond; and
d adopts a value of 0, 1, 2, 3, 4, 5 or 6, preferably 0, 1, 2 or 3, particularly preferably 1, 2 or 3.

For clarity, it should be noted that groups $$-\left[-Z^{21}-A^{21}-\right]-$$

may be identical or different on each occurrence.

Particularly preferred embodiments of the liquid-crystalline compounds for the use in the device according to the invention conform to the formulae disclosed in Tables A and B below.

It is further preferred that a liquid crystalline medium comprises,
  a mixture of compounds of formula II, preferably selected from compounds disclosed in Tables A and B, comprising,
    1 to 40%, preferably 5 to 20% of compounds of formula CY-n-(O)m, and/or
    1 to 40%, preferably 10 to 30% of compounds of formula CCY-n-(O)m, and/or
    1 to 40%, preferably 10 to 30% of compounds of formula CPY-n-(O)m, and/or
    1 to 50%, preferably 20 to 40% of compounds of formula CCH-n-m, and/or
    1 to 30%, preferably 5 to 20% of compounds of formula PCH-n-m,
    more preferably all above-mentioned compounds at the same time,
  0.5% to 2%. of a mixture dichroic dyes, preferably of three compounds of formula I, more preferably the compounds of formulae I'-1a, I'-4a and I'-5a, and
  0.01 to 10% of one or more compounds B, preferably selected from the group of compounds of formula B-Ic-3 to B-Ic-6,
however, in a total amount≤100%.

In another preferred embodiment, the liquid crystalline medium comprises,
  a mixture of compounds of formula II, preferably selected from compounds disclosed in Tables A and B, comprising,
    1 to 40%, preferably 5 to 30% of compounds of formula CC-n(V)-(O)m, and/or
    1 to 20%, preferably 5 to 15% of compounds of formula PGU-n-F, and/or
    1 to 40%, preferably 10 to 30% of compounds of formula ACQU-n-F, and/or
    1 to 30%, preferably 5 to 20% of compounds of formula PUQU-n-F, and/or
    1 to 30%, preferably 5 to 20% of compounds of formula CCP-n-m, and/or
    1 to 25%, preferably 5 to 15% of compounds of formula APUQU-n-F, and/or
    1 to 25%, preferably 5 to 20% of compounds of formula APUQU-n-F, and/or
    1 to 25%, preferably 3 to 15% of compounds of formula PGUQU-n-F, and/or
    1 to 25%, preferably 5 to 20% of compounds of formula CPGU-n-OT,
    more preferably all above-mentioned compounds at the same time,
  0.5% to 2%. of a mixture dichroic dyes, preferably of three compounds of formula I, more preferably the compounds of formulae I'-1a, I'-4a and I'-5a, and
  0.01 to 10% of one or more compounds A or B, preferably selected from the group of compounds of N-2 and/or N-8 or formula B-Ic-3 to B-Ic-6,
however, in a total amount 100%.

In another preferred embodiment, the liquid crystalline medium comprises,
  88 to 99% of compounds of formula K3·n, preferably compound K15,
  0.5% to 2%. of a mixture dichroic dyes, preferably of three compounds of formula I, more preferably the compounds of formulae I'-1a, I'-4a and I'-5a, and
  0.01 to 10% of one or more compounds A or B, preferably selected from the group of compounds of N-2 and/or N-8 or formula B-Ic-3 to B-Ic-6,
however, in a total amount≤100%.

The present invention also relates to a process for the production of a liquid crystalline medium as described above and below, comprising the step of mixing one or more liquid-crystalline compounds, with one or more dichroic dyes, and with one or more compounds (A) or (B).

Furthermore, the invention relates also to the use of a liquid crystalline medium as described above and below, in an electro-optical or temperature-reactive device.

Moreover, the present invention relates to a temperature-reactive device suitable for the regulation of light transmission, comprising a layer of a liquid-crystalline medium comprising, one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups.

In a preferred embodiment of the invention, the layer of the liquid-crystalline medium is arranged between two substrate layers.

In accordance with the invention, the two substrate layers may consist, inter alia, each and independently from another of a polymeric material, of metal oxide, for example ITO, of glass and/or of metal, preferably each and independently of another of glass and/or ITO, in particular glass/glass, glass/ITO or ITO/ITO.

In a preferred embodiment, the substrates are arranged with a separation of at least 1 µm from one another, preferably at least 2 µm from another, and more preferably at least 3 µm from another, where the layer of the liquid-crystalline medium is located in the interspace. The substrate layers can be kept at a defined separation from one another by, for example, spacers, or projecting structures in the layer. Typical spacer materials are commonly known to the expert, as for example spacers made of plastic, silica, epoxy resins, etc.

In accordance with the present invention, the device comprises no alignment layers adjacent to the layer of the liquid-crystalline medium.

In a preferred embodiment of the invention, the device has two or more polarisers, at least one of which is arranged on one side of the layer of the liquid-crystalline medium and at least one of which is arranged on the opposite side of the layer of the liquid-crystalline medium. The layer of the liquid-crystalline medium and the polarisers here are preferably arranged parallel to one another.

The polarisers can be linear polarisers or circular polarisers. Preferably, precisely two polarisers are present in the device. In this case, it is furthermore preferred for the polarisers either both to be linear polarisers or both to be circular polarisers. In accordance with a possible embodiment of the invention, however, a linear polariser can also be used together with a circular polariser.

If two linear polarisers are present in the device, it is preferred in accordance with the invention for the polarisation directions of the two polarisers to be the same or to be rotated merely by a small angle to one another.

It is furthermore preferred in the case where two circular polarisers are present in the device for these to have the same polarisation direction, i.e. either both are right-hand circular-polarised or both are left-hand circular-polarised.

The polarisers can be reflective or absorptive polarisers. A reflective polariser in the sense of the present application reflects light having one polarisation direction or one type of circular-polarised light, while being transparent to light having the other polarisation direction or the other type of circular-polarised light. Correspondingly, an absorptive polariser absorbs light having one polarisation direction or one type of circular-polarised light, while being transparent to light having the other polarisation direction or the other type of circular-polarised light. The reflection or absorption is usually not quantitative, meaning that complete polarisation of the light passing through the polariser does not take place.

For the purposes of the present invention, both absorptive and reflective polarisers can be employed. Preference is given to the use of polarisers, which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF (advanced polariser film, 3M). Furthermore, it is possible to employ polarisers based on wire grids (WGPs, wire-grid polarisers) which reflect infra-red light. Examples of absorptive polarisers, which can be employed in the devices according to the invention, are the Itos XP38 polariser film and the Nitto Denko GU-1220DUN polariser film. An example of a circular polariser, which can be used in accordance with the invention, is the APNCP37-035-STD polariser (American Polarizers). A further example is the CP42 polariser (ITOS).

In another embodiment according to the invention, the polarisers represent the substrate layers between which the liquid-crystalline medium is arranged, i.e. no additional substrate layers are present in the device.

However, in another preferred embodiment, the device according to the present invention comprises no polarisers.

In a further preferred embodiment of the invention, the layer of the liquid-crystalline medium is located between two flexible layers, for example flexible polymer films. The device according to the invention is consequently flexible and bendable and can be rolled up, for example. The flexible layers can represent the substrate layer, the alignment layer, and/or polarisers. Further layers, which are preferable flexible, may also, be present. For a more detailed disclosure of the preferred embodiments, in which the layer of the liquid-crystalline medium is located between flexible layers, reference is given to the application US 2010/0045924.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

In a further preferred embodiment of the invention, the liquid-crystalline medium has a solid or gelatinous consistency. The term "gelatinous" refers to a consistency having the nature of or resembling jelly. The device according to the invention is consequently less susceptible to damage. If, furthermore, exclusively flexible, bendable and cuttable layers are present in addition to the layer of the liquid-crystalline medium, the device can not only be rolled up, but pieces of an area required in each case can also be cut out.

The device may furthermore comprise filters which block light of certain wavelengths, for example UV filters. In accordance with the invention, further functional layers, such as, for example, protective films, heat-insulation films or metal-oxide layers, may also be present.

Furthermore, electrodes and further electrical components and connections may be present in the device according to the invention in order to facilitate electrical switching of the device, comparable to the switching of an LC display. In a preferred embodiment of the invention, however, electrodes and further electrical components and connections are not present.

Furthermore, it is generally preferred on use of the device for the switching to be effected by a temperature change (and not by the application of an electric field). Preferred temperature ranges of the switching operation are indicated in following sections.

The way in which the devices according to the invention are produced is known to the person skilled in the art in the area of devices containing liquid-crystalline media.

A suitable process for the production of the device according to the invention comprises at least a step of providing a layer of the liquid-crystalline medium comprising one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups, onto a substrate. The application in a layer is preferably carried out between two substrate layers. Alternative methods such as flow-filling, printing, etc., which are commonly known by the expert, are also in accordance with the present invention It may be necessary in accordance with the invention to carry out a heating and/or cooling step in order to obtain an initial homeotropic alignment of the liquid-crystalline compounds.

For the preparation of the liquid-crystalline medium, one or more dichroic dyes, and one or more compounds (A) having a three-dimensional structure, a molecular weight of greater than 450 Da, and one or more anchor groups, or one or more organic compounds (B) having one or more ring groups, and one or more anchor groups, are dissolved or dispersed in the liquid-crystalline compound or the mixture comprising the liquid-crystalline compound.

The functional principle of the device according to the invention will be explained in detail below. It is noted that no restriction of the scope of the claimed invention, which is not present in the claims, is to be derived from the comments on the assumed way of functioning.

The light transmission of the device according to the invention is dependent on the temperature. In a preferred embodiment, the light transmission of the device is high at low temperature and low at high temperature.

In a preferred embodiment, the device according to the invention has a boundary state A and a boundary state B. For the purposes of the present application, the term boundary state is taken to mean a state in which the transmission reaches a maximum or minimum value and changes no further or virtually no further on a further reduction or increase in the temperature. However, this does not exclude a further change in the transmission taking place in the case of a considerable reduction or increase in the temperature beyond the temperature of the boundary state.

The device preferably has a boundary state A with a transmission $T_A$ at a temperature below a boundary temperature $\theta_A$, and a boundary state B with a transmission $T_B$ at a temperature above a boundary temperature $\theta_B$, where:

$\theta_A < \theta_B$ and $T_A > T_B$.

$\theta_A$ is preferably between −20 and +30° C., particularly preferably between −5 and +25° C.

$\theta_B$ is preferably between +30 and +100° C., particularly preferably between +35 and +80° C.

The temperature span between the two boundary temperatures $\theta_A$ and $\theta_B$ represents the range in which the device reacts to temperature changes with a change in transmission (working range or switching range of the device). The device is preferably used at temperatures within this range. However, it can also be used at temperatures outside this range, preferably at temperatures below $\theta_A$.

In accordance with the invention, the working range of the device can be set and changed by varying the composition of the liquid crystalline mixture. In accordance with the invention, the working range of the device can furthermore be set and changed by varying the substrate material.

The switching range of the device is preferably at room temperature and above. Particularly preferred values for the span between the boundary temperatures $\theta_A$ and $\theta_B$, and thus for the switching range of the device, are:
0° C. to 100° C.;
more preferably 5° C. to 80° C.;
even more preferably 20° C. to 60° C.

In accordance with the invention, the transition between the two boundary states A and B with increasing temperature and the transition between the two boundary states B and A with decreasing temperature proceeds gradually via intermediate values of the transmission T. Preferably, the intermediate values of T are not necessarily equal upon cooling and heating.

In accordance with the present invention, a large proportion of the liquid-crystalline compounds and especially the dichroic dyes are aligned vertically to the substrate surface at low temperature (homeotropic alignment). With increasing temperature, the proportion of vertically aligned compounds and dichroic dye molecules decreases. From a certain temperature, whose value mainly depends on the compounds A or B used, the composition of the liquid-crystalline medium and the type of substrate material, a large proportion of the compounds and in particular, the dichroic dyes are aligned planar to the substrate surface. Accordingly, the liquid-crystalline compounds and dichroic dye molecules in state A of the switching element are preferably predominantly homeotropically aligned, and are preferably predominantly aligned in a planar arrangement in state B of the switching element.

Therefore, the change from homeotropic to planar alignment of liquid-crystalline compounds and dichroic dyes can be used in order to achieve a temperature-dependent change in the transmission of the device.

The present invention thus also relates to a process for the temperature-dependent control of the light transmission through a device comprising a layer of a liquid-crystalline medium comprising one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups, characterized in that at least the dichroic dyes of the liquid-crystalline medium change from a homeotropic alignment to a planar alignment as a function of the temperature.

In another embodiment of the present invention, a large proportion of the liquid crystalline medium including the dichroic dyes are aligned vertically to the substrate surface at low temperature (homeotropic alignment). With increasing temperature, the proportion of vertically aligned compounds in the liquid crystalline medium decreases. Above the clearing point of the liquid crystalline medium or the liquid crystalline compound, whose value mainly depends on the used liquid-crystalline medium, the amount of homeotropic aligned components decreases due to the phase transition from nematic to isotropic. Therefore, a large proportion of liquid-crystalline medium in state A of the switching element is preferably predominantly nematic-homeotropically aligned, and the liquid-crystalline medium is in its isotropic phase in state B of the switching element.

Accordingly, the phase transition from the nematic-homeotropic aligned phase to the isotropic phase of the liquid-crystalline medium can be used in order to achieve a temperature-dependent change in the transmission of the device.

The present invention thus also relates to a process for the temperature-dependent control of the light transmission through a device comprising a layer of a liquid-crystalline medium comprising one or more liquid-crystalline compounds, one or more dichroic dyes, and one or more compounds (A) having a three-dimensional structure, a molecular weight of greater than 450 Da, and one or more anchor groups, or one or more organic compounds (B) having one or more ring groups, and one or more anchor groups, characterized in that at least the dichroic dyes of the liquid-crystalline medium change its orientation from a homeotropic alignment to a diffuse state as a function of the temperature.

However, it is also preferred that at least the dichroic dyes of the liquid-crystalline medium change its orientation from a homeotropic alignment to a to a planar alignment and further to a diffuse state as a function of the temperature.

Using an example, it will be illustrated how a process of this type can be carried out. At the same time, the example also shows a preferred embodiment of the device according to the invention. In the case of homeotropic alignment of the liquid-crystalline compounds and the dichroic dyes in the layer of the liquid-crystalline medium, respectively, large proportions of incident light entering the medium from one side also passes through the medium without being absorbed by the dichroic dyes. This corresponds to boundary state A with high transmission $T_A$, as defined above. In the case of planar alignment of the liquid-crystalline compounds and the dichroic dyes, or in case that the liquid crystalline medium is in its isotropic phase having a diffuse orientation of the dichroic dyes, the light passing through the medium is partially or completely absorbed by the layer of the liquid-crystalline medium. This state corresponds to boundary state B with low transmission $T_B$, as defined above. At intermediate values of the temperature between the temperatures of boundary states A and B, transmission values are achieved which are between the transmission values in boundary states A and B.

The device in accordance with the present invention can be installed on windows, facades, doors, or roofs.

The invention thus also relates to the use of the device according to the invention for the regulation of light entry and/or energy input into an interior.

The invention furthermore relates to the use of a device as described above and below comprising layer of a liquid-crystalline medium as described above and below, for the temperature-dependent regulation of light transmission from the environment into an enclosed space.

As mentioned above, the invention is not restricted to buildings, but can also be used in transport containers, for example shipping containers, or vehicles. It is particularly preferred to install the device on glass panes of windows or to use it as a component of multipane insulating glass. The device according to the invention can be installed on the outside, the inside or, in the case of multipane glass, in the cavity between two glass panes, where the inside is taken to mean the side of a glass surface, which faces the interior. Preference is given to use on the inside or in the cavity between two glass panes in the case of multipane insulating glass.

The device according to the invention may completely cover the respective glass surface on which it is installed or only partly cover it. In the case of complete coverage, the influence on light transmission through the glass surface is at its maximum. In the case of partial coverage, by contrast, a certain amount of light is transmitted by the glass surface through the uncovered parts, even in the state of the device with low transmission. Partial coverage can be achieved, for example, by installing the devices on the glass surface in the form of strips or certain patterns.

In a preferred embodiment of the invention, the device regulates light transmission through the glass surface into the interior automatically, solely owing to its temperature reactivity. Manual regulation is not necessary here.

According to this preferred embodiment, the device does not comprise any electrodes or other electronic components with which electrical switching of the device could take place.

In an alternative embodiment of the invention, the device also has electrical switchability in addition to its temperature switchability. In particular, electrodes are present in the device in this case, and the liquid-crystalline medium has positive or negative dielectric anisotropy $\Delta\epsilon$. It is preferred here for $\Delta\epsilon$ to be $\geq 1.5$ or for $\Delta\epsilon$ to be $\leq -1.5$. In this embodiment of the invention, manual, electrically promoted switching of the device from high transmission to low transmission and vice versa is possible. The way in which such electrical switching of a liquid-crystalline medium from a homeotropic state into another state can be achieved is known to the person skilled in the art in the area of devices containing liquid-crystalline media.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status Nov. 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz or if explicitly stated at a frequency 19 GHz. The threshold voltages, as well as all other electro-optical properties, are determined using test cells produced at Merck KGaA, Germany. The test cells for the determination of Δ∈ have a cell thickness of approximately 20 μm. The electrode is a circular ITO electrode having an area of 1.13 cm² and a guard ring. The orientation layers are SE-1211 from Nissan Chemicals, Japan, for homeotropic orientation (Δ∥) and polyimide AL-1054 from Japan Synthetic Rubber, Japan, for homogeneous orientation (∈⊥). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is only one example of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to, or alternative to any invention presently claimed.

Preferred liquid-crystalline compounds in accordance with the present invention are shown in Tables A and B below.

The structures of the liquid-crystalline compounds are indicated below by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12.

Table A only shows the acronym for the parent structure. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF₃ | $C_nH_{2n+1}$ | OCF₃ | H | H |
| nOCF₃•F | $C_nH_{2n+1}$ | OCF₃ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

TABLE A

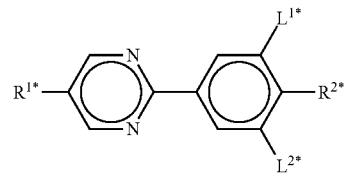

PYP

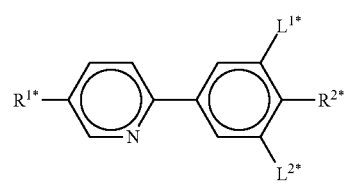

PYRP

TABLE A-continued
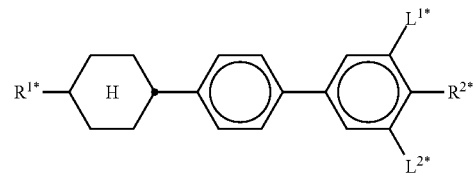
BCH
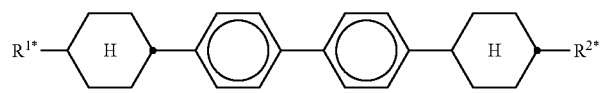
CBC
CCH
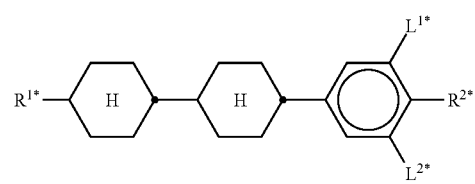
CCP
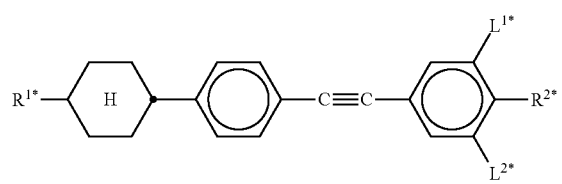
CPTP
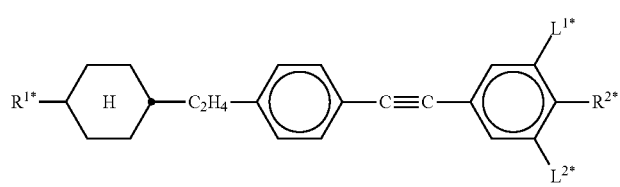
CEPTP
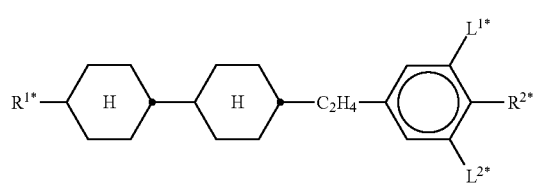
ECCP TABLE A-continued
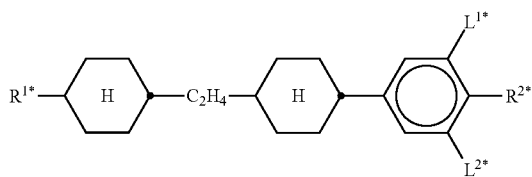
CECP
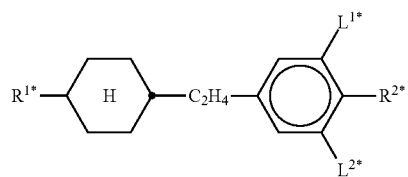
EPCH
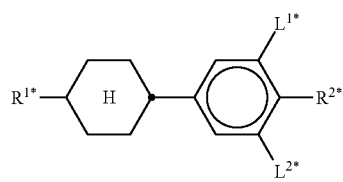
PCH
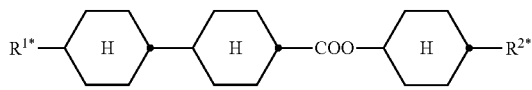
CH
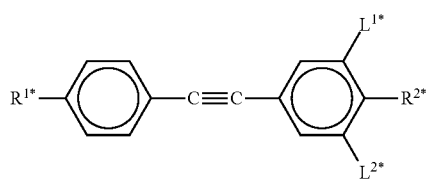
PTP
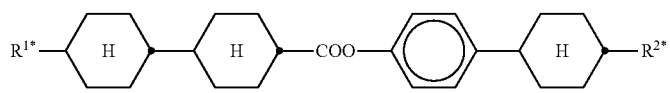
CCPC
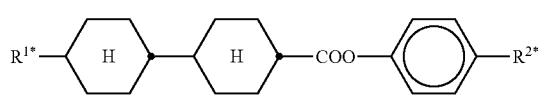
CP
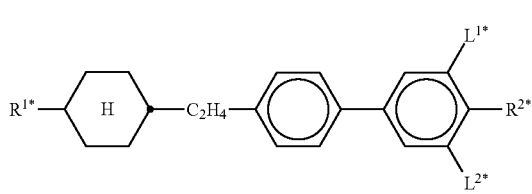
BECH TABLE A-continued
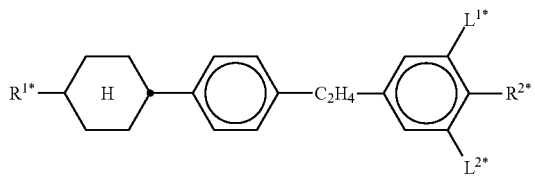
EBCH
CPC
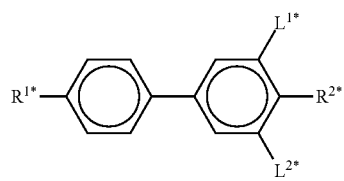
B
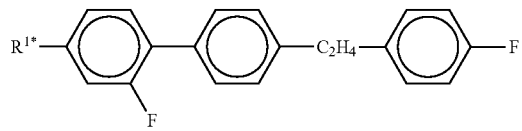
FET-nF
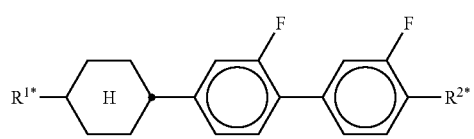
CGG
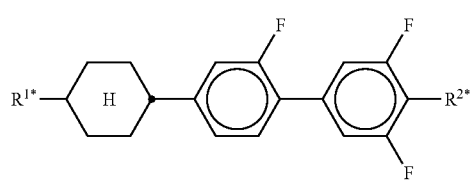
CGU
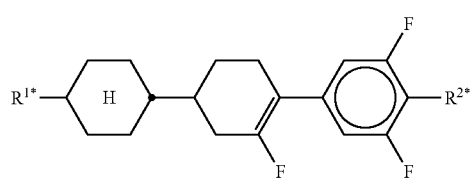
CFU TABLE B
n, m, z preferably denote, independently of one another, 1, 2, 3, 4, 5 or 6.
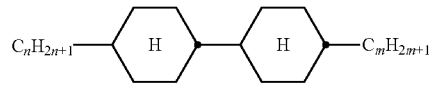
CCH-nm
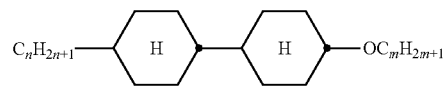
CCH-n0m
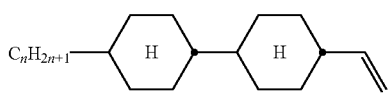
CC-n-V
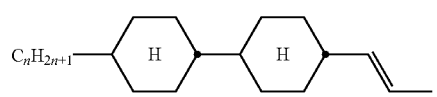
CC-n-V1
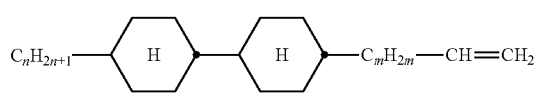
CC-n-mV
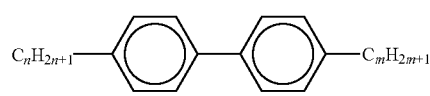
PP-n-m
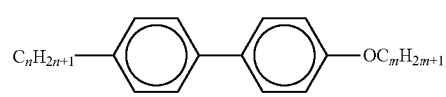
PP-n-Om
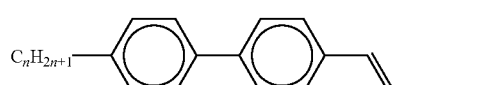
PP-n-Vm
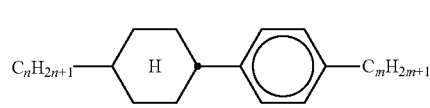
PCH-nm
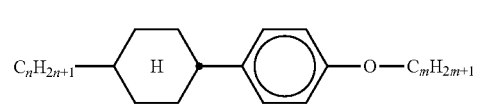
PCH-n0m TABLE B-continued
n, m, z preferably denote, independently of one another, 1, 2, 3, 4, 5 or 6.
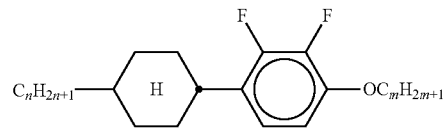
CY-n-Om
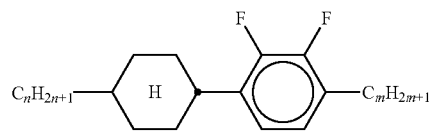
CY-n-m
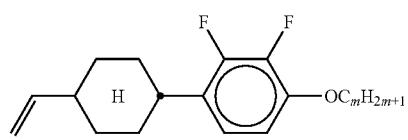
CY-V-Om
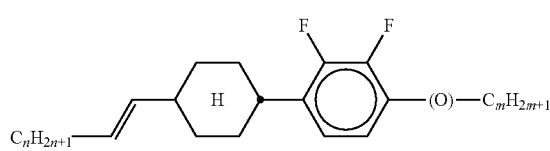
CY-nV-(O)m
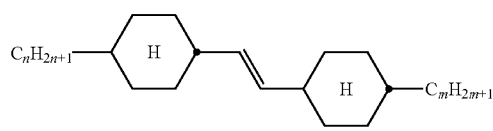
CVC-n-m
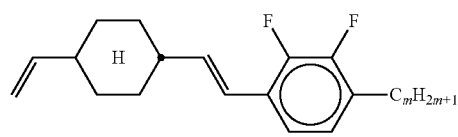
CVY-V-m
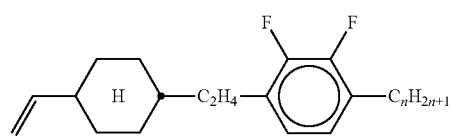
CEY-V-m
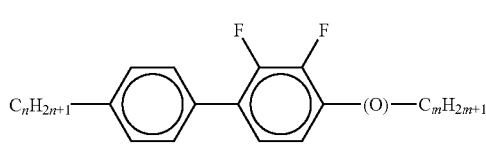
PY-n-(O)m
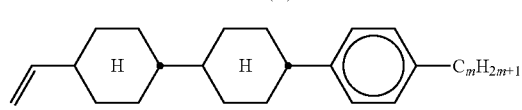
CCP-V-m TABLE B-continued
n, m, z preferably denote, independently of one another, 1, 2, 3, 4, 5 or 6.
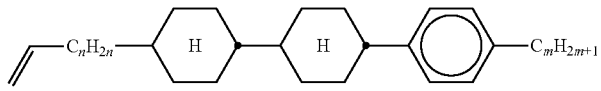
CCP-Vn-m
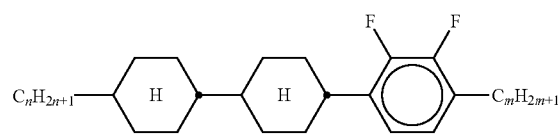
CCY-n-m
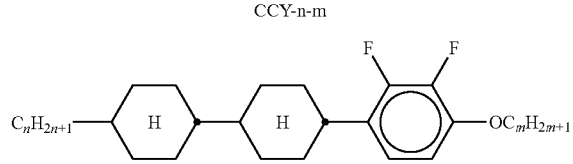
CCY-n-Om
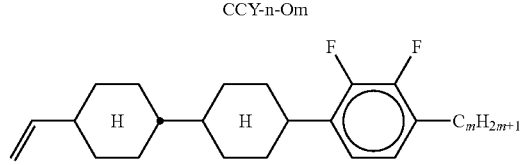
CCY-V-m
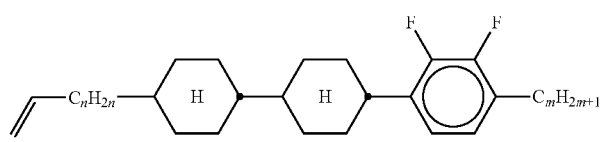
CCY-Vn-m
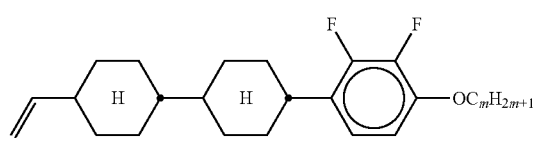
CCY-V-Om
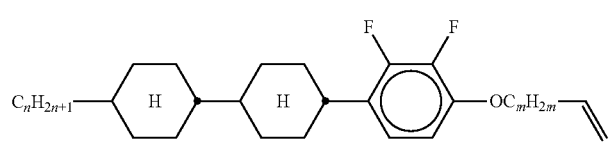
CCY-n-OmV
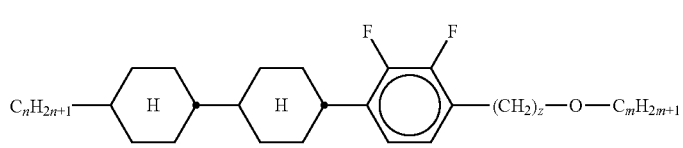
CCY-n-zOm
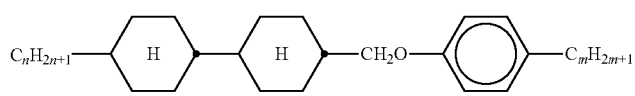
CCOC-n-m TABLE B-continued
n, m, z preferably denote, independently of one another, 1, 2, 3, 4, 5 or 6.
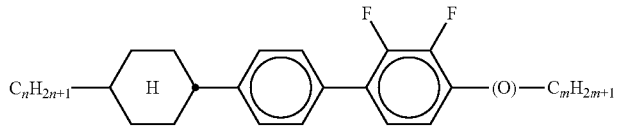
CPY-n-(O)m
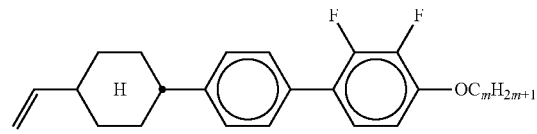
CPY-V-Om
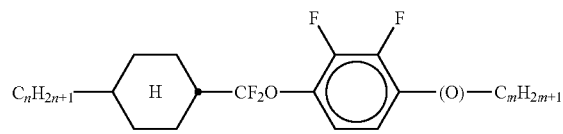
CQY-n-(O)m
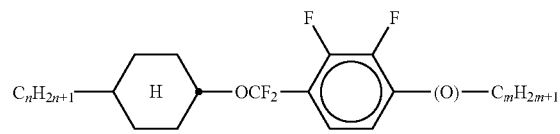
CQIY-n-(O)m
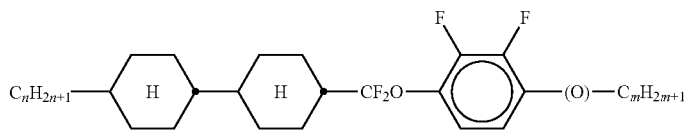
CCQY-n-(O)m
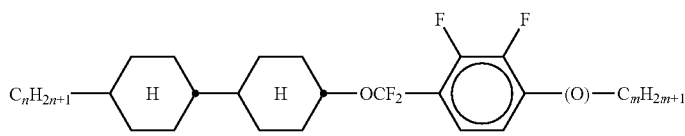
CCQIY-n-(O)m
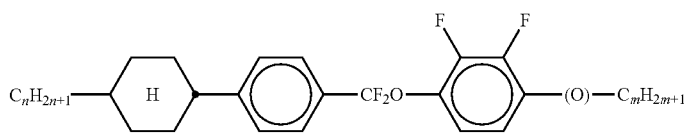
CPQY-n-(O)m
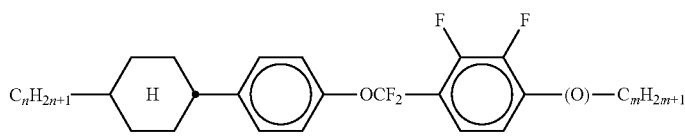
CPQIY-n-Om TABLE B-continued
n, m, z preferably denote, independently of one another, 1, 2, 3, 4, 5 or 6.
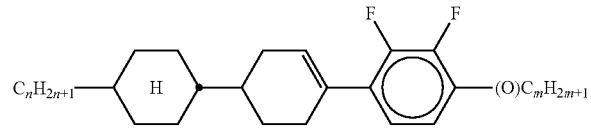
CLY-n-(O)m
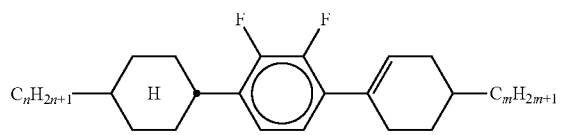
CYLI-n-m
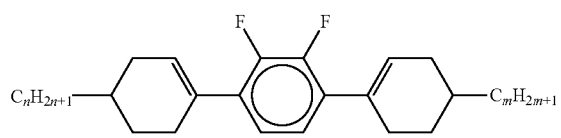
LYLI-n-m
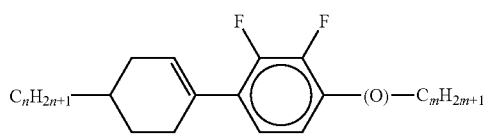
LY-n-(O)m
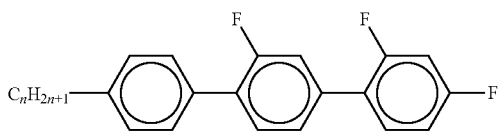
PGIGI-n-F
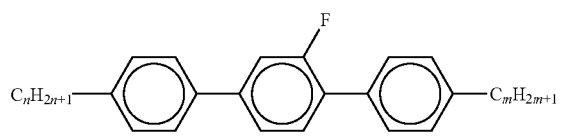
PGP-n-m
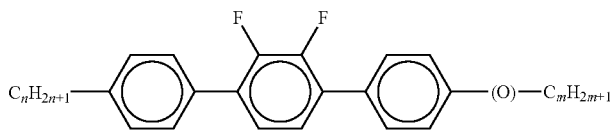
PYP-n-(O)m
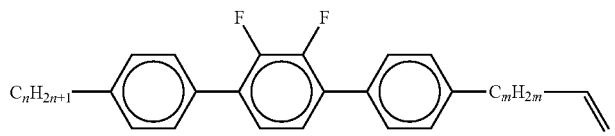
PYP-n-mV TABLE B-continued
n, m, z preferably denote, independently of one another, 1, 2, 3, 4, 5 or 6.
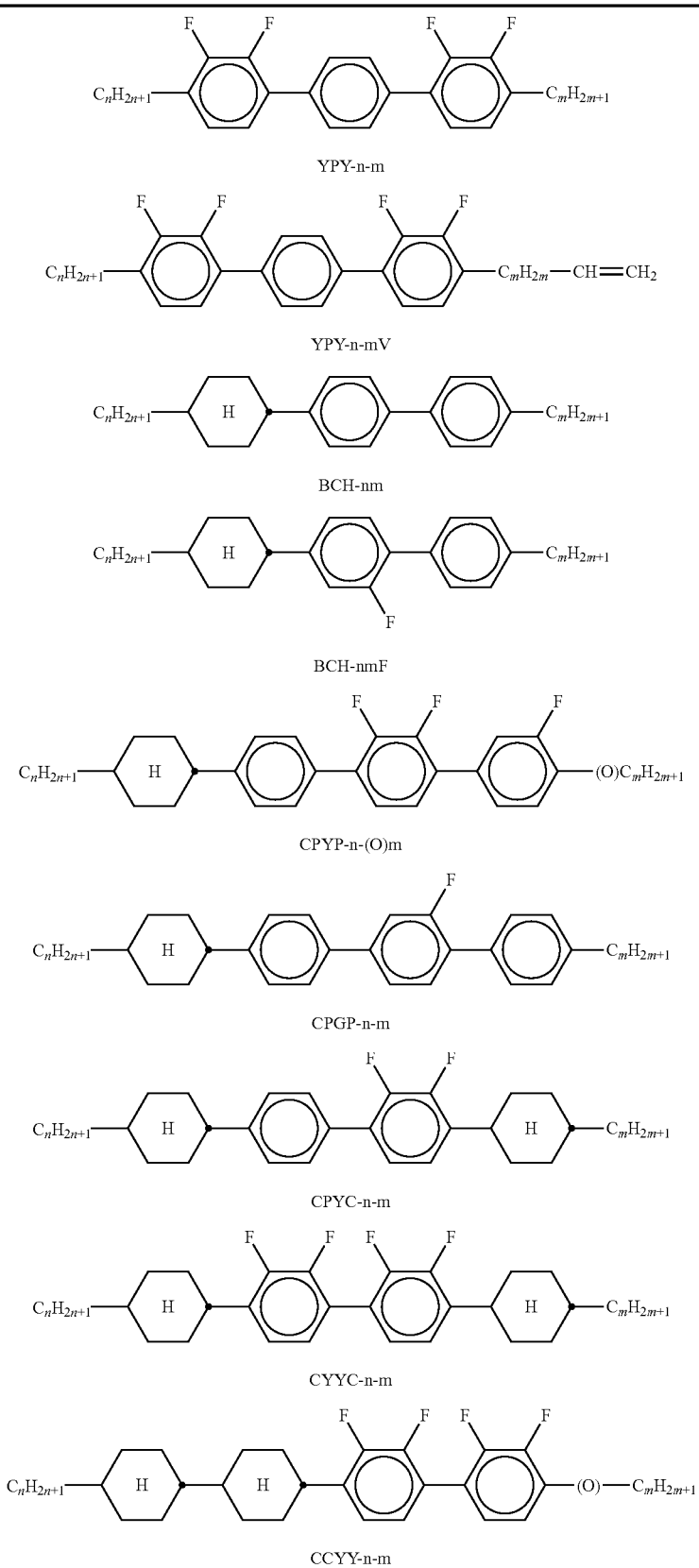

TABLE B-continued
n, m, z preferably denote, independently of one another, 1, 2, 3, 4, 5 or 6.
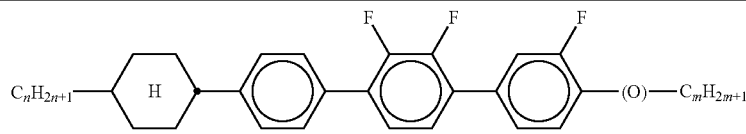
CPYG-n-(O)m
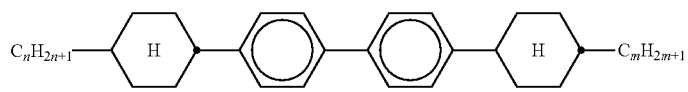
CBC-nm
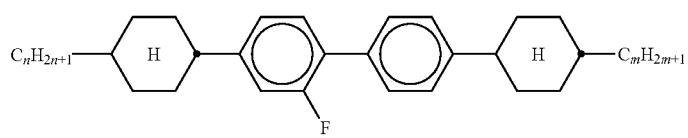
CBC-nmF
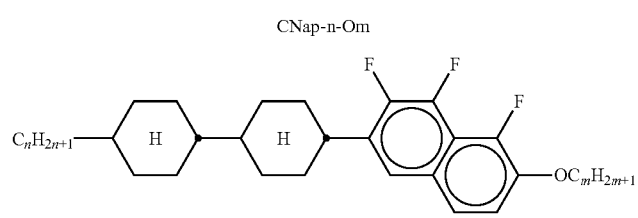
CNap-n-Om
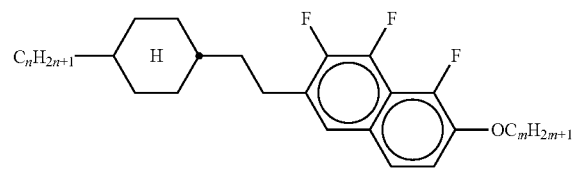
CCNap-n-Om
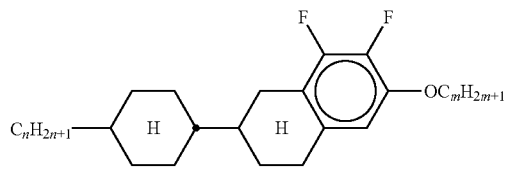
CENap-n-Om
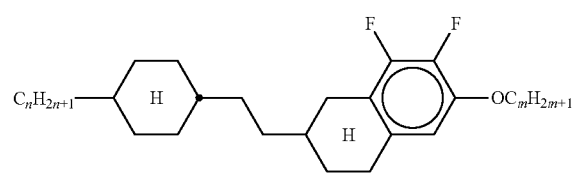
CTNap-n-Om
CETNap-n-Om TABLE B-continued
n, m, z preferably denote, independently of one another, 1, 2, 3, 4, 5 or 6.
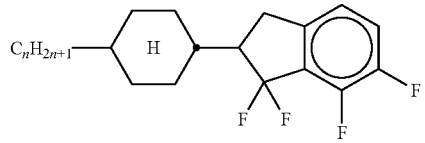
CK-n-F
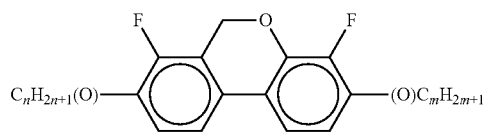
DFDBC-n(O)-(O)m
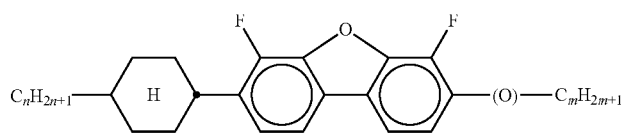
C-DFDBF-n-(O)m
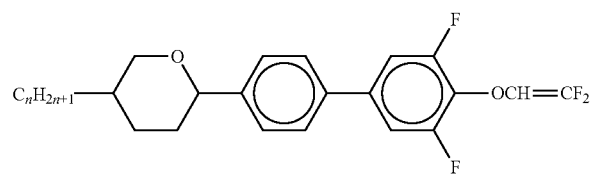
APU-n-OXF
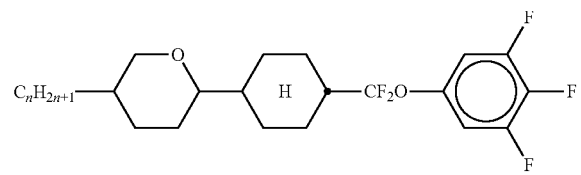
ACQU-n-F
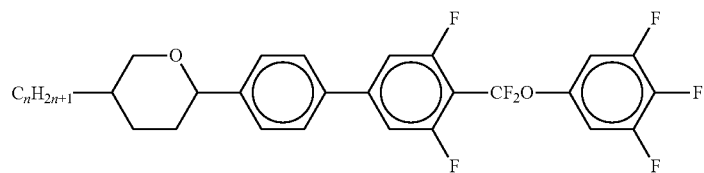
APUQU-n-F
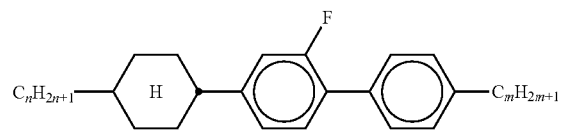
BCH-n•Fm TABLE B-continued
n, m, z preferably denote, independently of one another, 1, 2, 3, 4, 5 or 6.
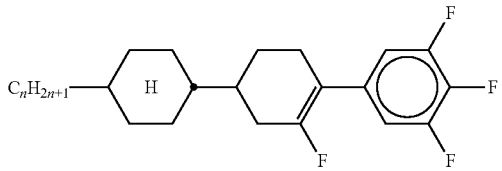
CFU-n-F
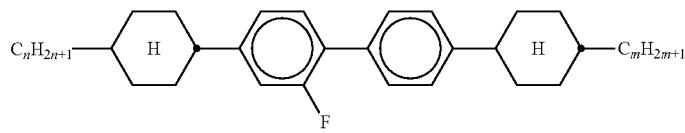
CBC-nmF
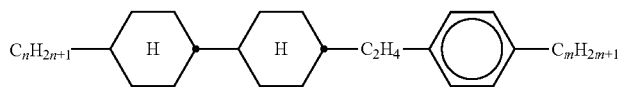
ECCP-nm
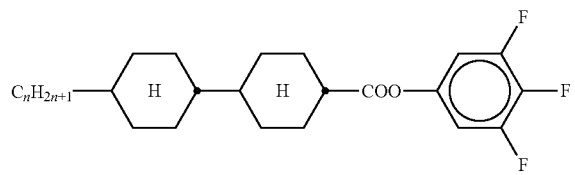
CCZU-n-F
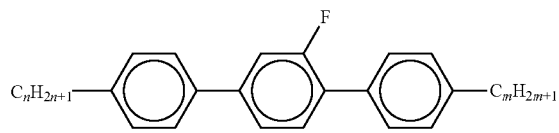
PGP-n-m
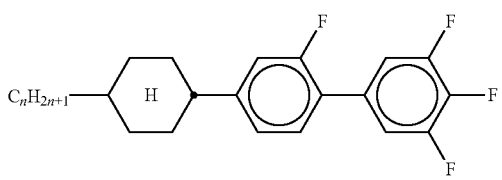
CGU-n-F
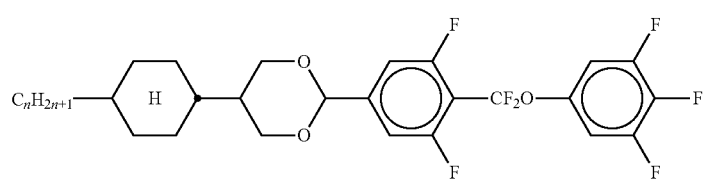
CDUQU-n-F TABLE B-continued
n, m, z preferably denote, independently of one another, 1, 2, 3, 4, 5 or 6.
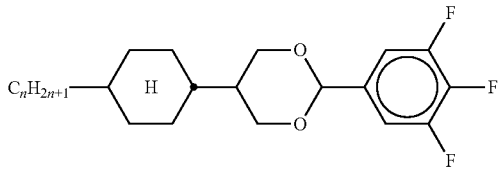
CDU-n-F
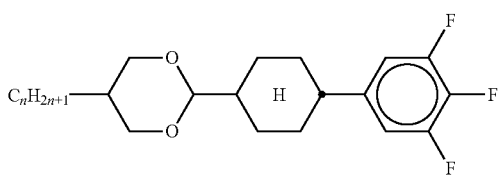
DCU-n-F
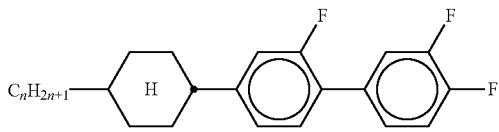
CGG-n-F
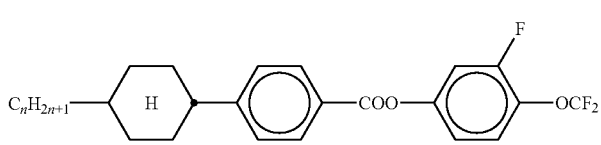
CPZG-n-OT
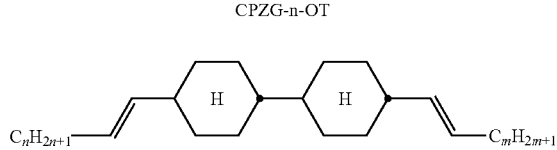
CC-nV-Vm
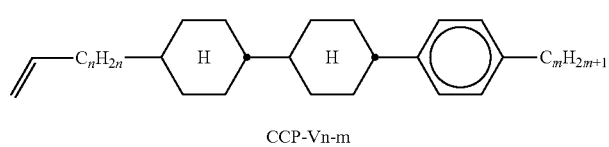
CCP-Vn-m
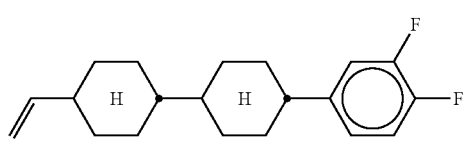
CCG-V-F
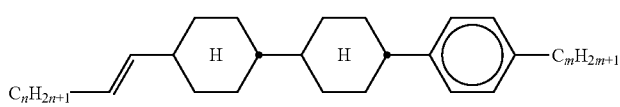
CCP-nV-m TABLE B-continued
n, m, z preferably denote, independently of one another, 1, 2, 3, 4, 5 or 6.
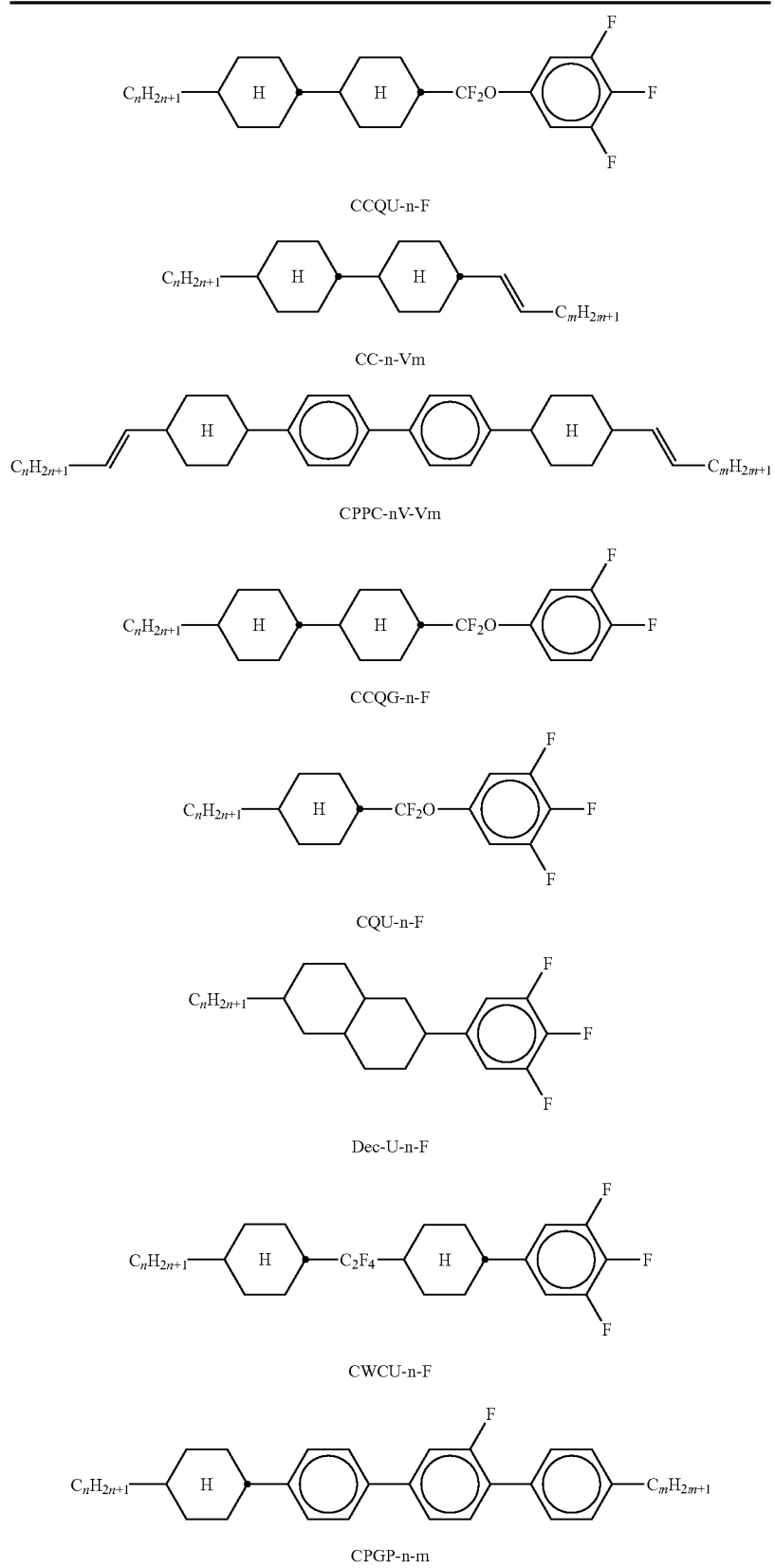
CCQU-n-F
CC-n-Vm
CPPC-nV-Vm
CCQG-n-F
CQU-n-F
Dec-U-n-F
CWCU-n-F
CPGP-n-m TABLE B-continued
n, m, z preferably denote, independently of one another, 1, 2, 3, 4, 5 or 6.
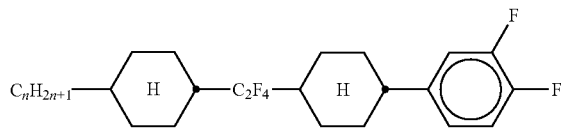
CWCG-n-F
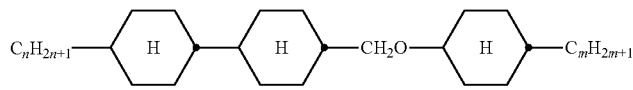
CCOC-n-m
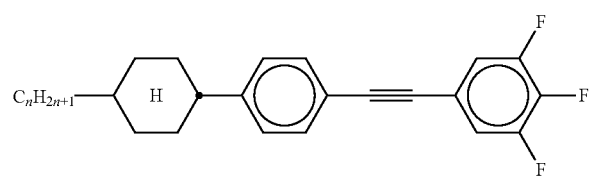
CPTU-n-F
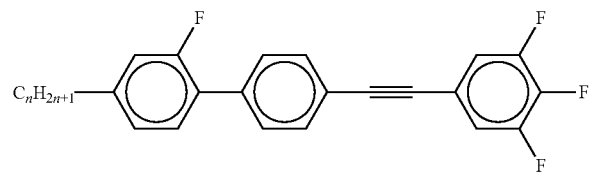
GPTU-n-F
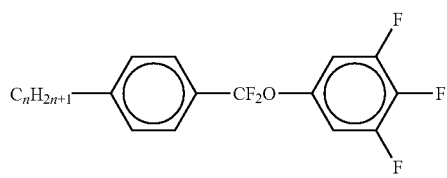
PQU-n-F
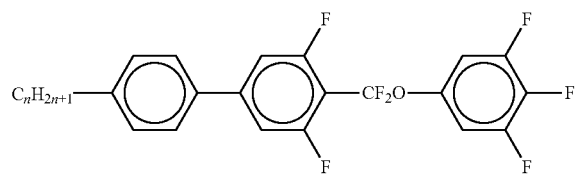
PUQU-n-F
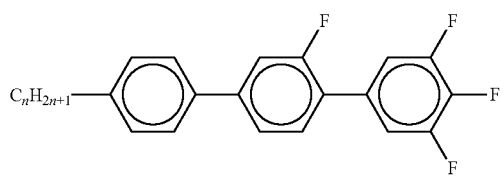
PGU-n-F
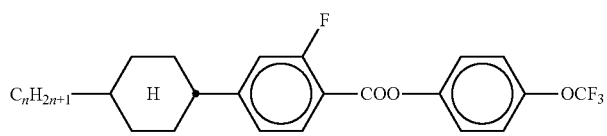
CGZP-n-OT TABLE B-continued
n, m, z preferably denote, independently of one another, 1, 2, 3, 4, 5 or 6.
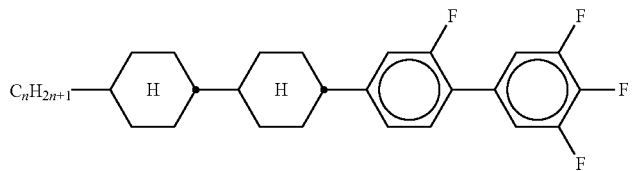
CCGU-n-F
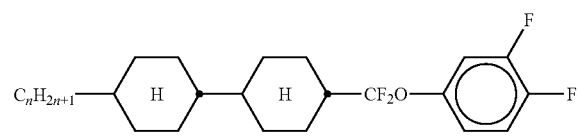
CCQG-n-F
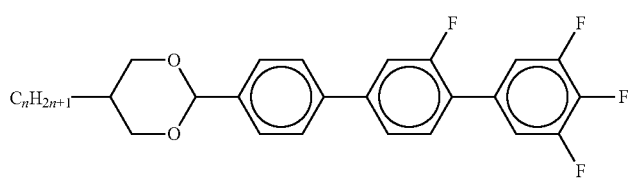
DPGU-n-F
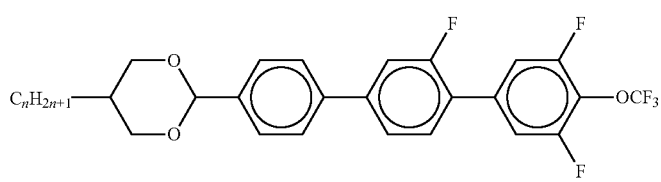
DPGU-n-OT
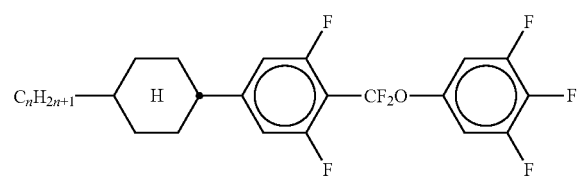
CUQU-n-F
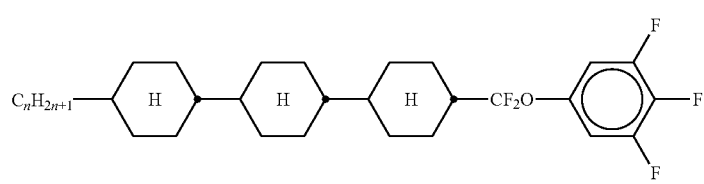
CCCQU-n-F
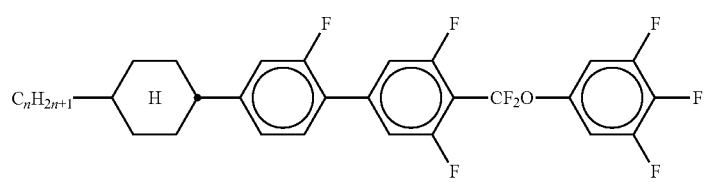
CGUQU-n-F TABLE B-continued
n, m, z preferably denote, independently of one another, 1, 2, 3, 4, 5 or 6.
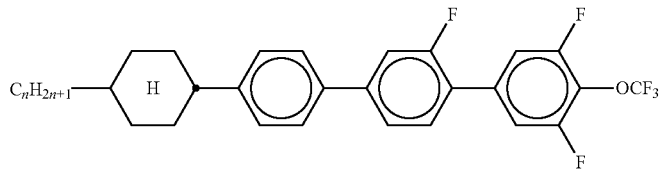
CPGU-n-OT
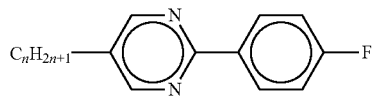
PYP-n-F
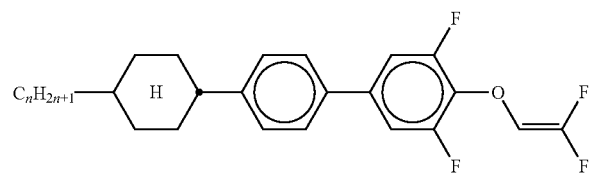
CPU-n-OXF
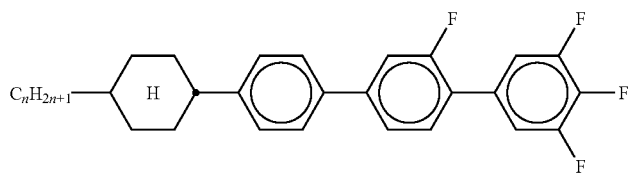
CPGU-n-F
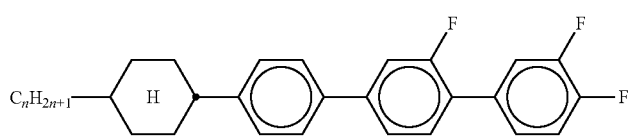
CPGG-n-F
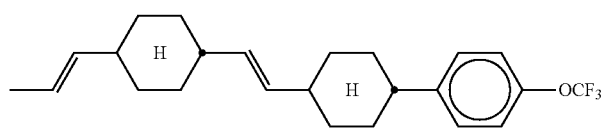
CVCP-1V-OT
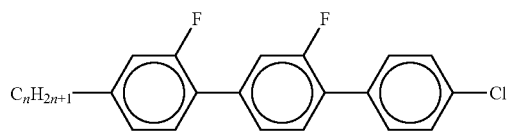
GGP-n-Cl
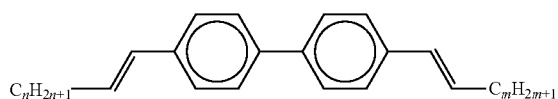
PP-nV-Vm TABLE B-continued
n, m, z preferably denote, independently of one another, 1, 2, 3, 4, 5 or 6.
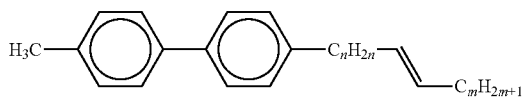
PP-1-nVm
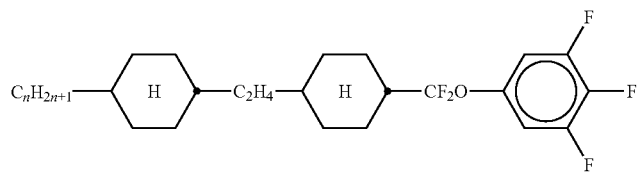
CWCQU-n-F
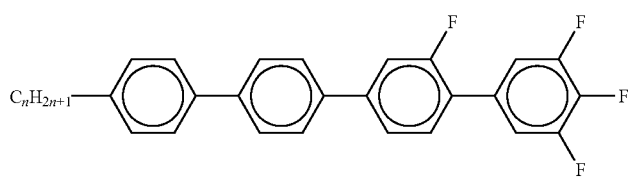
PPGU-n-F
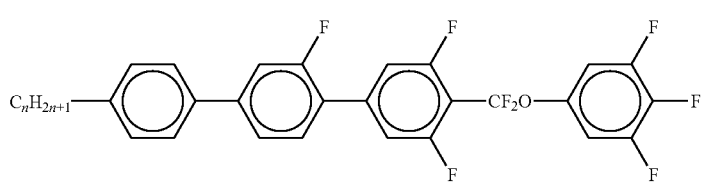
PGUQU-n-F
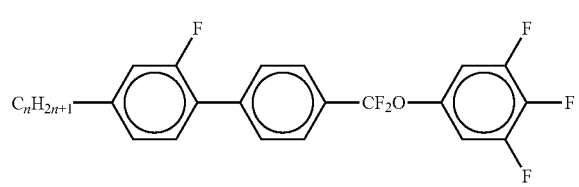
GPQU-n-F
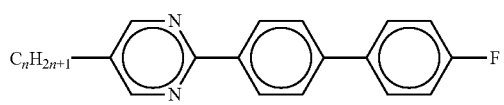
MPP-n-F
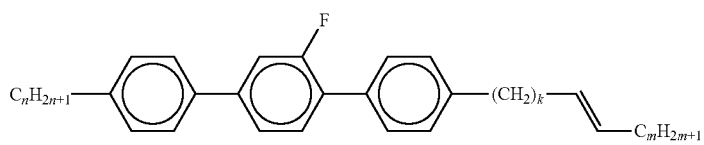
PGP-n-kVm
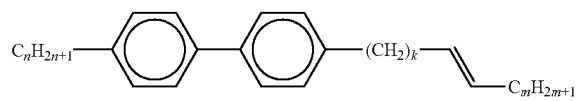
PP-n-kVm TABLE B-continued
n, m, z preferably denote, independently of one another, 1, 2, 3, 4, 5 or 6.
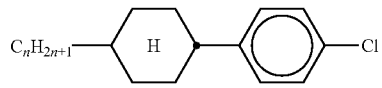
PCH-nCl
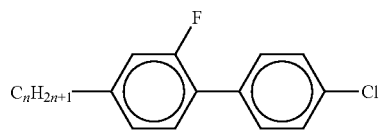
GP-n-Cl
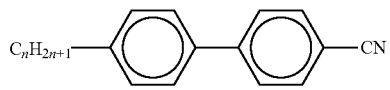
K3•n
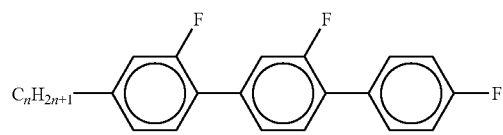
GGP-n-F
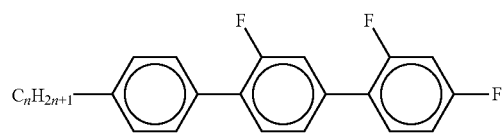
PGIGI-n-F
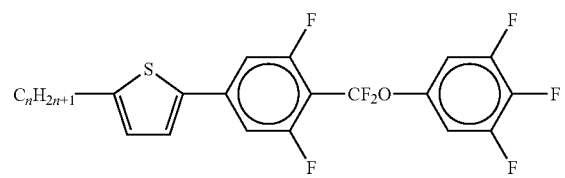
SUQU-n-F
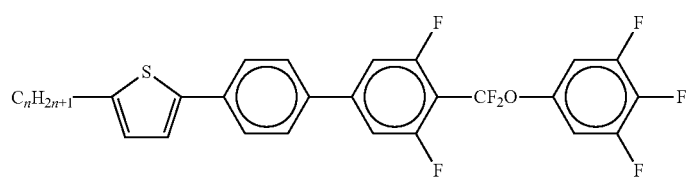
SPUQU-n-F Table C below shows stabilisers, which are preferably employed in the liquid-crystalline media in accordance with the invention.
TABLE C
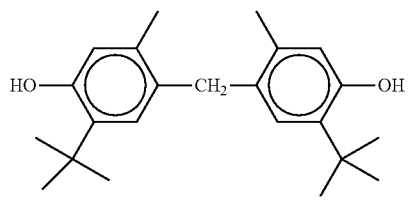
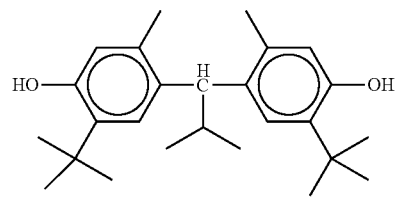
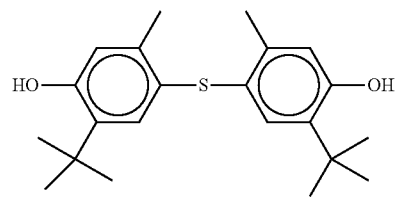
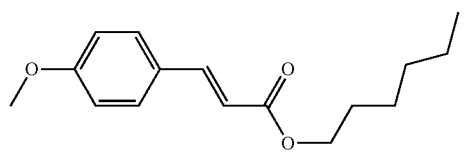 [SMILES: CCCCCCOC(=O)/C=C/c1ccc(OC)cc1]
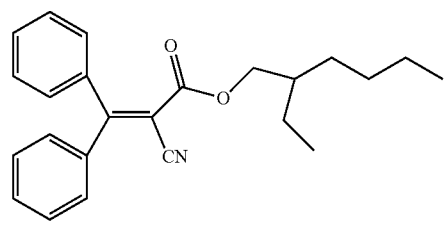 [SMILES: CCCCC(CC)COC(=O)C(C#N)=C(c1ccccc1)c1ccccc1]
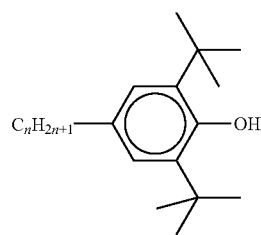
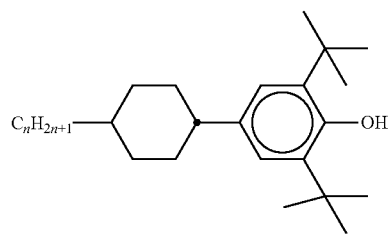

TABLE C-continued
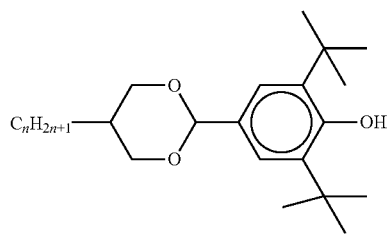
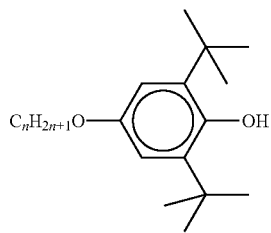
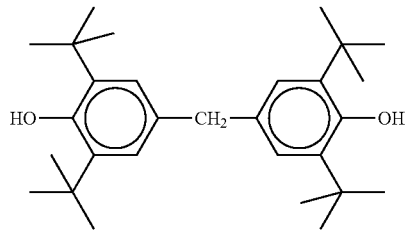
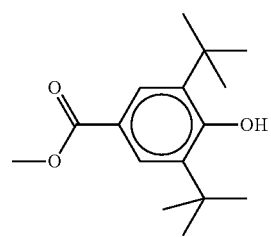
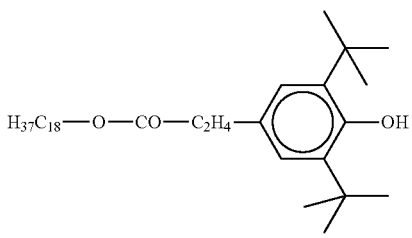
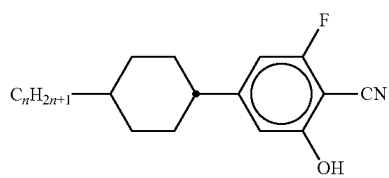
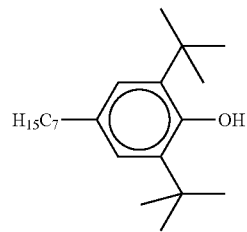

TABLE C-continued
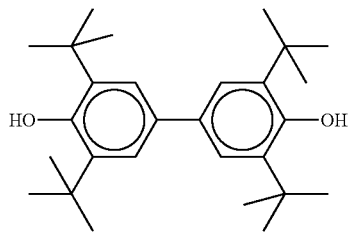
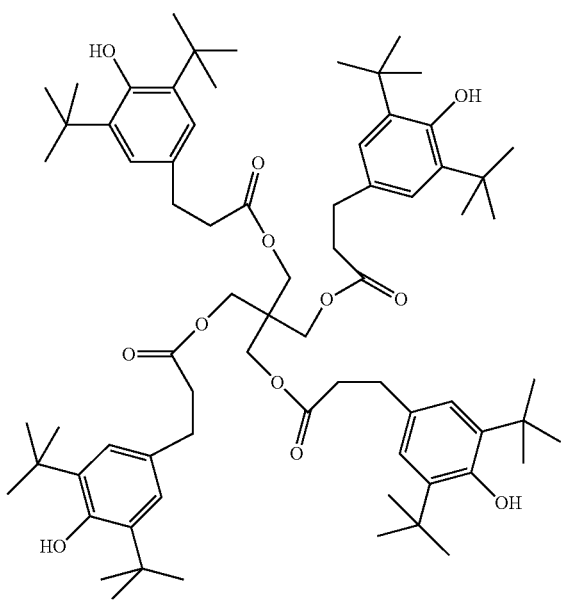 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
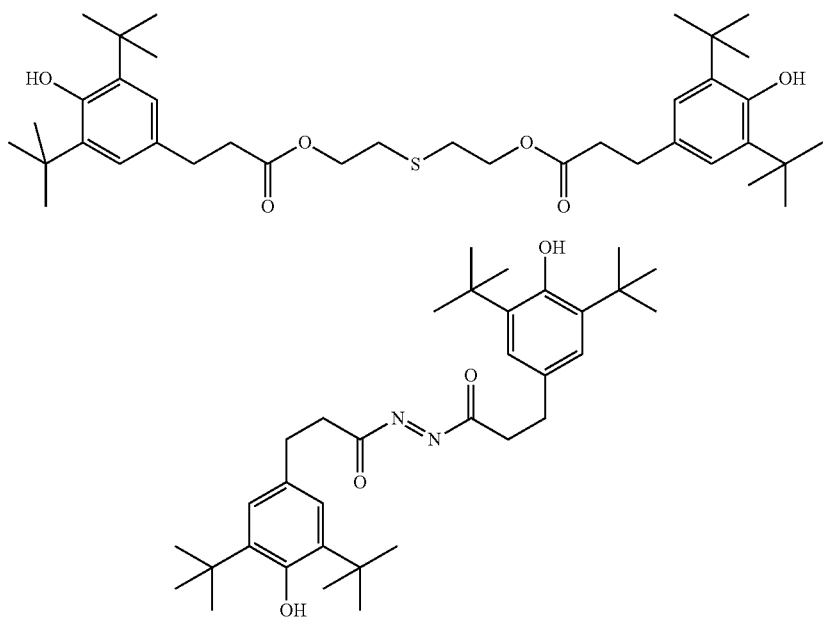

TABLE C-continued
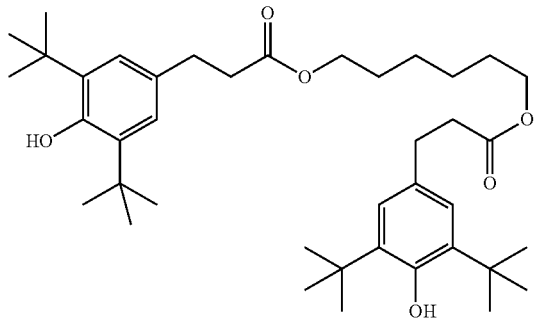 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
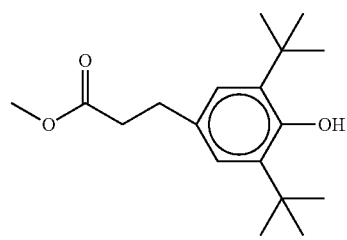
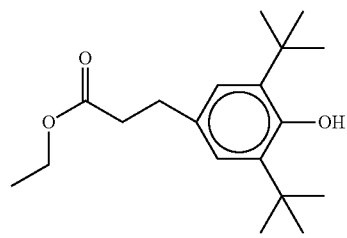
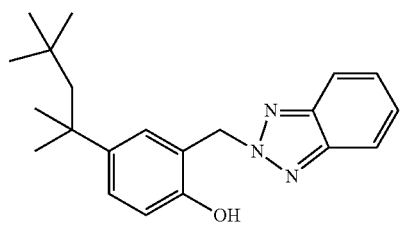 [SMILES: CC(C)(C)CC(C)(C)c1ccc(O)c(Cn2nc3ccccc3n2)c1]
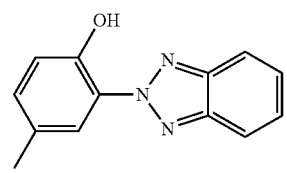
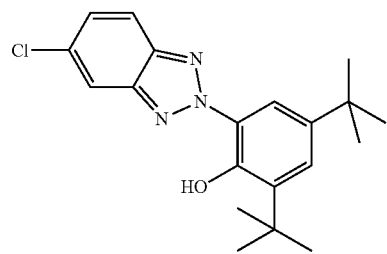 [SMILES: CC(C)(C)c1cc(-n2nc3ccc(Cl)cc3n2)c(O)c(C(C)(C)C)c1]

TABLE C-continued
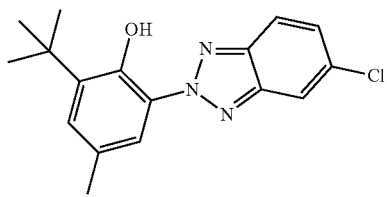 [SMILES: Cc1cc(-n2nc3ccc(Cl)cc3n2)c(O)c(C(C)(C)C)c1]
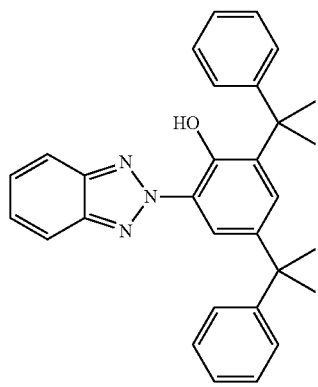 [SMILES: CC(C)(c1ccccc1)c1cc(-n2nc3ccccc3n2)c(O)c(C(C)(C)c2ccccc2)c1]
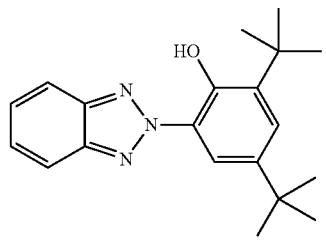 [SMILES: CC(C)(C)c1cc(-n2nc3ccccc3n2)c(O)c(C(C)(C)C)c1]
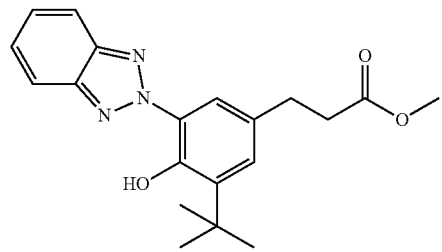 [SMILES: COC(=O)CCc1cc(-n2nc3ccccc3n2)c(O)c(C(C)(C)C)c1]
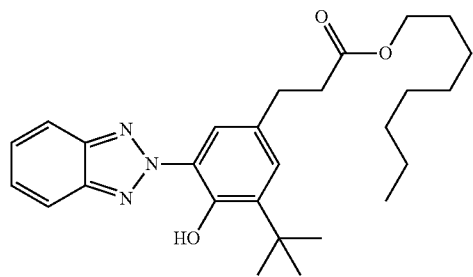 [SMILES: CCCCCCCCOC(=O)CCc1cc(-n2nc3ccccc3n2)c(O)c(C(C)(C)C)c1]

TABLE C-continued
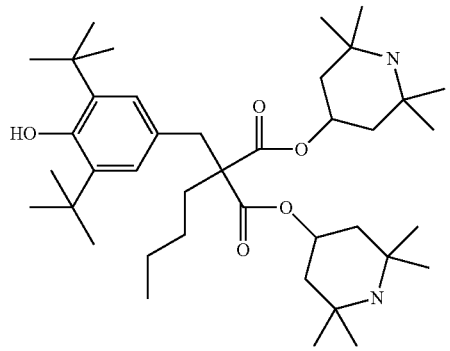 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
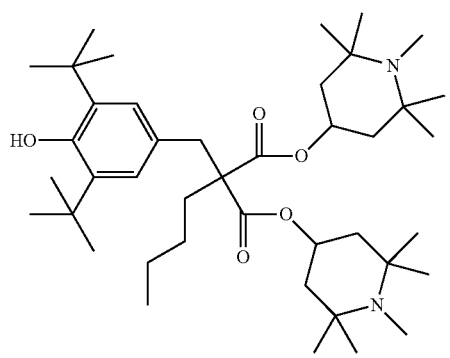 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
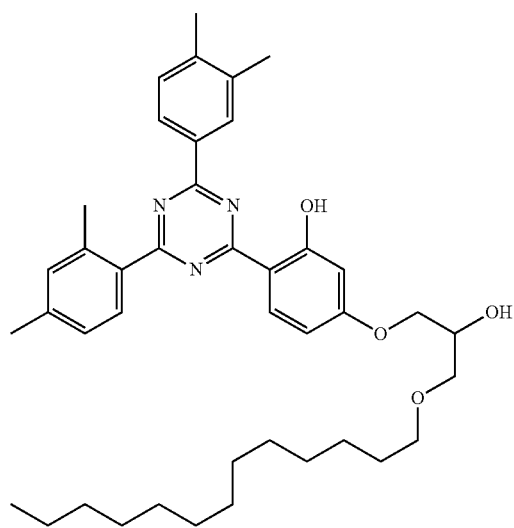 [SMILES: CCCCCCCCCCCCCOCC(O)COc1ccc(-c2nc(-c3ccc(C)c(C)c3)nc(-c3ccc(C)cc3C)n2)c(O)c1]

TABLE C-continued
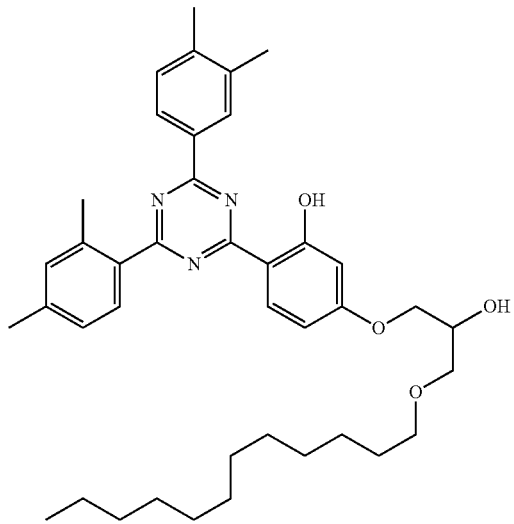 [SMILES: CCCCCCCCCCCCOCC(O)COc1ccc(-c2nc(-c3ccc(C)c(C)c3)nc(-c3ccc(C)cc3C)n2)c(O)c1]
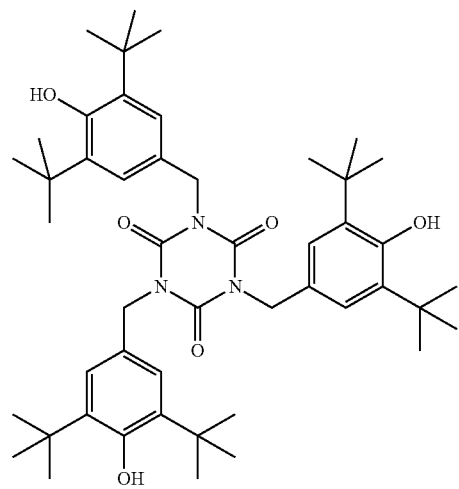 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
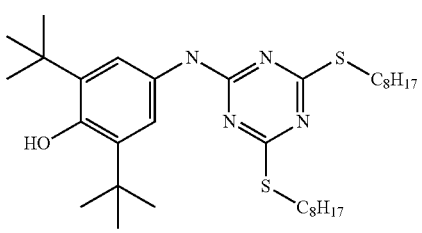
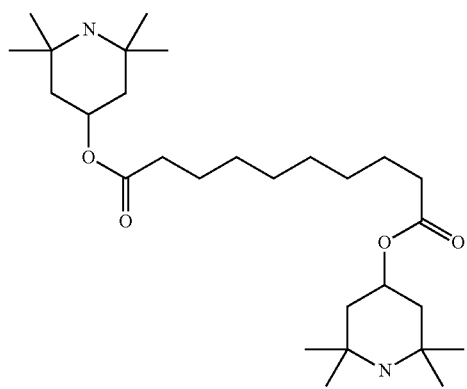

TABLE C-continued
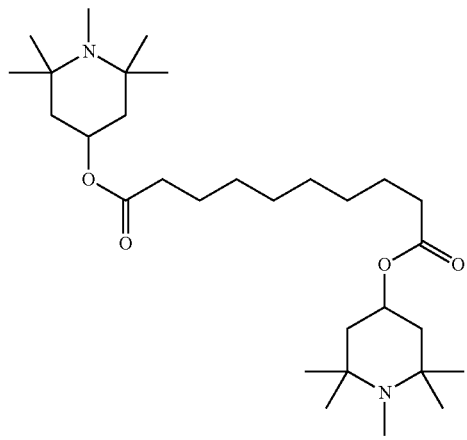
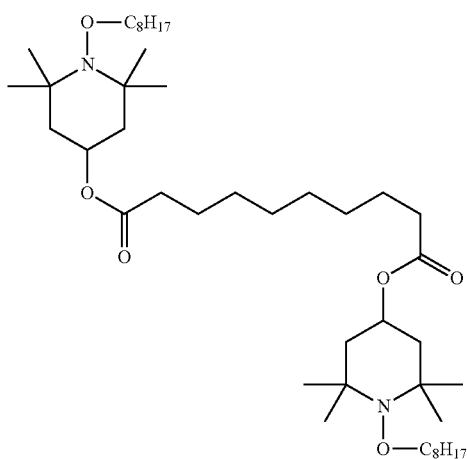
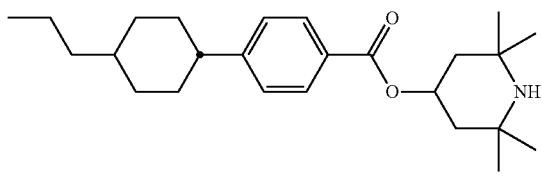
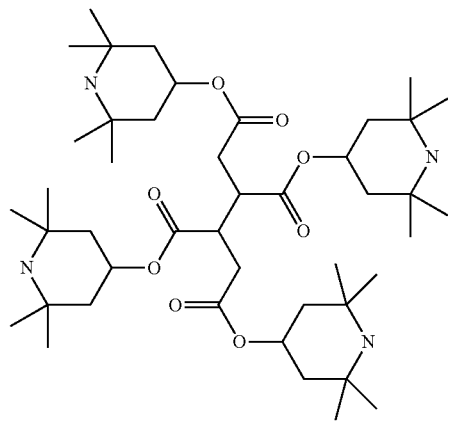

TABLE C-continued

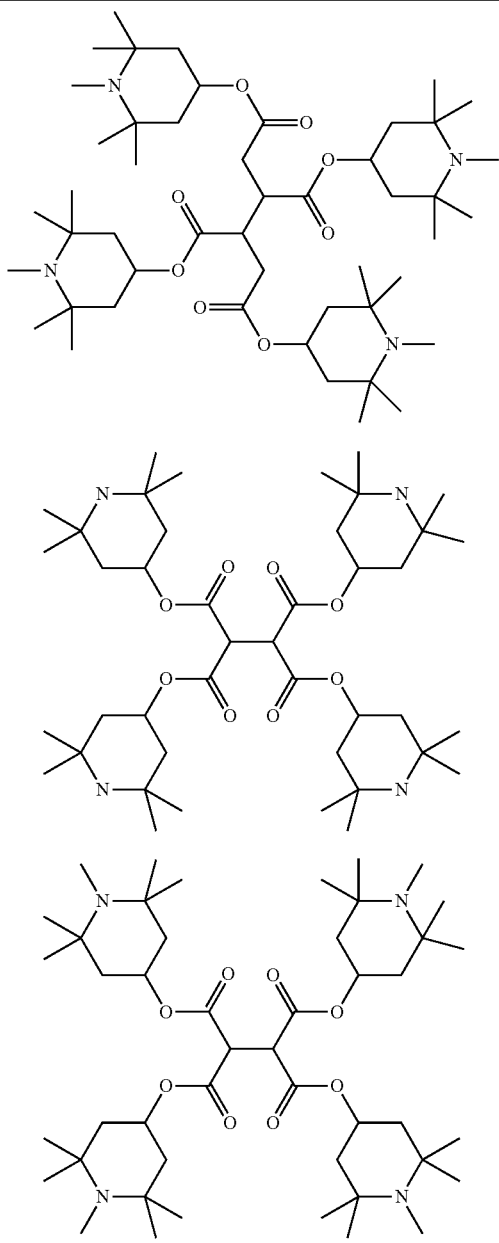

Note:
n in this table stands for an integer from 1 to 12.

Unless indicated otherwise, all concentrations in the present application are indicated in percent by weight and are based on the corresponding mixture as a whole, comprising all solid or liquid-crystalline components, without solvents.

The following abbreviations and symbols are used:
Δn optical anisotropy at 20° C. and 589 nm,
Δε dielectric anisotropy at 20° C. and 1 kHz,
cl.p., T(N,I) clearing point [° C.].

The following examples explain the present invention without it being intended for a restriction in the subject matter of the invention to be derived therefrom.

EXAMPLES

Figure 1:
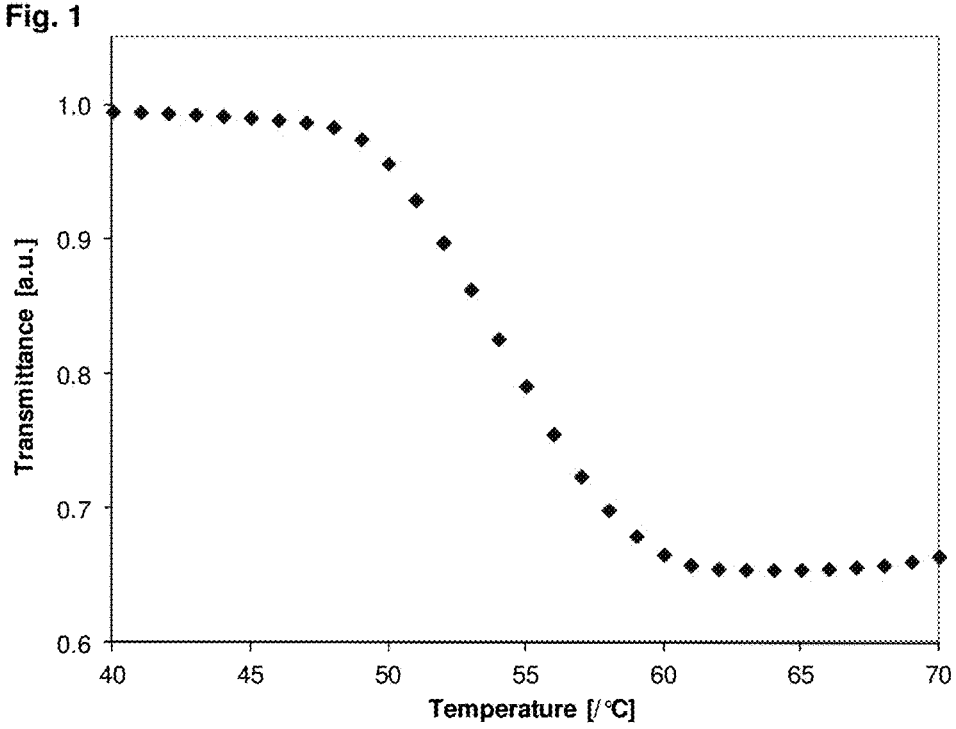
FIG. 1 shows an example of the switching process of a device containing a medium according to entry 1 according to the invention.

1) General Procedure for the Production of the Devices According to the Invention The liquid-crystalline medium (composition varies in accordance with the examples below) is introduced into an electro-optical cell having a thickness of about 4 μm. The substrate material of the cells varies in accordance with the examples below (ITO, glass or its combination). The cells according to the present invention are not provided with polarisers. Finally, temperature-dependent measurements of the light transmission of the cells are carried out.

2) Examples of Liquid-crystalline Media Used

| No. | Mixture No. | SAM | SAM No. | Amount of SAM [in %] | Amount of F355 [in %] | Amount of F357 [in %] | Amount of F593 [in %] |
|---|---|---|---|---|---|---|---|
| 1 | B | + | i | 2.0 | 0.36 | 0.74 | 0.90 |
| 2 | C | + | iii | 1.0 | 0.18 | 0.37 | 0.45 |
| 3 | C | + | iii | 1.0 | 0.36 | 0.74 | 0.90 |
| 4* | B | + | i | 2.0 | — | — | — |
| 5 | A | + | ii | 2.0 | 0.36 | 0.74 | 0.90 |
| 6 | C | + | iv | 0.3 | 0.36 | 0.74 | 0.90 |
| 7 | B | + | v | 0.25 | 0.36 | 0.74 | 0.90 |
| 8 | A | + | vi | 1.0 | 0.36 | 0.74 | 0.90 |

*Comparative example in a test cell provided with linear polarisers

Self Aligning Additives Used:

i

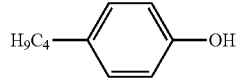

ii

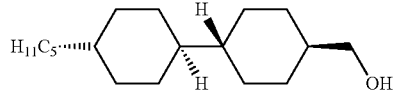

iii

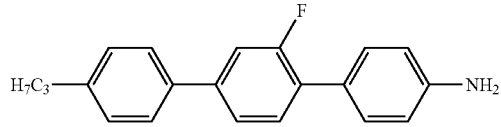

iv

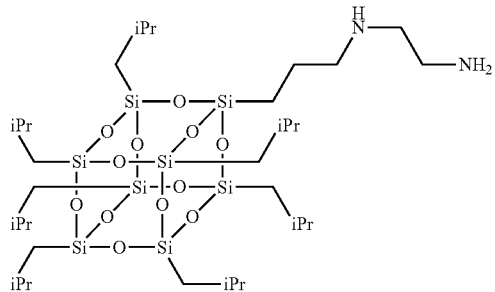

v

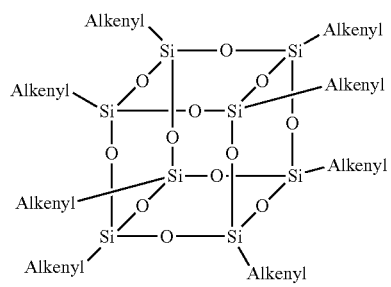

vi

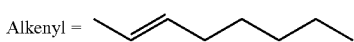

Liquid-crystalline Mixtures Used:

| Composition and properties liquid crystal mixture A | | |
|---|---|---|
| Composition | | |
| Compound | | Conc. |
| No. | Abbreviation | [% w/w] |
| 1 | CY-3-O4 | 14.0 |
| 2 | CCY-3-O2 | 9.0 |
| 3 | CCY-3-O3 | 9.0 |
| 4 | CPY-2O2 | 10.0 |
| 5 | CPY-3-O2 | 10.0 |
| 6 | CCY-3-1 | 8.0 |
| 7 | CCH-34 | 9.0 |
| 8 | CCH-35 | 6.0 |
| 9 | PCH-53 | 10.0 |
| 10 | CCH-301 | 6.0 |
| 11 | CCH-303 | 9.0 |
| Σ | | 100.0 |

| Physical Properties | |
|---|---|
| T(N, I) = | 80° C. |
| $n_o$(20° C., 589 nm) = | 1.4791 |
| $n_e$(20° C., 589 nm) = | 1.5692 |
| Δn(20° C., 589 nm) = | 0.0901 |
| $\epsilon_\perp$(20°, 1 kHz) = | 6.7 |
| Δε(20°, 1 kHz) = | −3.3 |

| Composition and properties liquid crystal mixture B | | |
|---|---|---|
| Composition | | |
| Compound | | Conc. |
| No. | Abbreviation | [% w/w] |
| 1 | CC-4-V | 10.0 |
| 2 | CC-5-V | 13.5 |
| 3 | PGU-3-F | 6.5 |
| 4 | ACQU-2-F | 10.0 |
| 5 | ACQU-3-F | 12.0 |
| 6 | PUQU-3-F | 11.0 |
| 7 | CCP-V-1 | 12.0 |
| 8 | APUQU-2-F | 6.0 |
| 9 | APUQU-3-F | 7.0 |
| 10 | PGUQU-3-F | 8.0 |
| 11 | CPGU-3-OT | 4.0 |
| Σ | | 100.0 |

| Physical Properties | |
|---|---|
| T(N, I) = | 77° C. |
| $n_o$(20° C., 589 nm) = | 1.4814 |
| $n_e$(20° C., 589 nm) = | 1.5940 |
| Δn(20° C., 589 nm) = | 0.1126 |
| $\epsilon_\perp$(20°, 1 kHz) = | 4.6 |
| Δε(20°, 1 kHz) = | 19.2 |

| Composition and properties liquid crystal mixture C | | |
|---|---|---|
| Composition | | |
| Compound | | Conc. |
| No. | Abbreviation | [% w/w] |
| 1 | K15 | 100.0 |
| Σ | | 100.0 |
| Physical Properties | | |
| T(N, I) = | | 35° C. |
| $n_o$(20° C., 589 nm) = | | 1.5300 |
| $n_e$(20° C., 589 nm) = | | 1.7420 |
| Δn(20° C., 589 nm) = | | 0.0212 |
| $\epsilon_\perp$(20°, 1 kHz) = | | 6.0 |
| Δε(20°, 1 kHz) = | | 20.0 |

Dichroic Dyes Used:

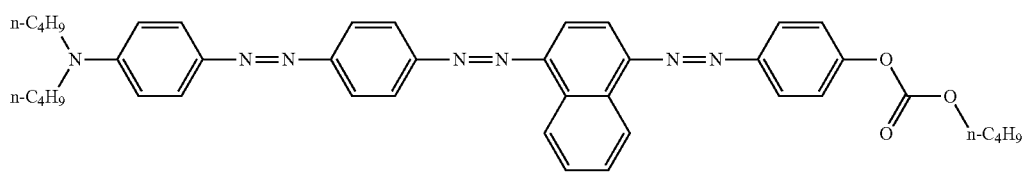

F355

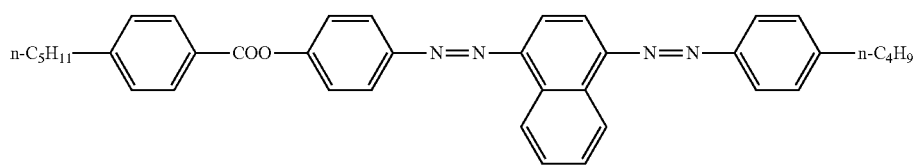

F357

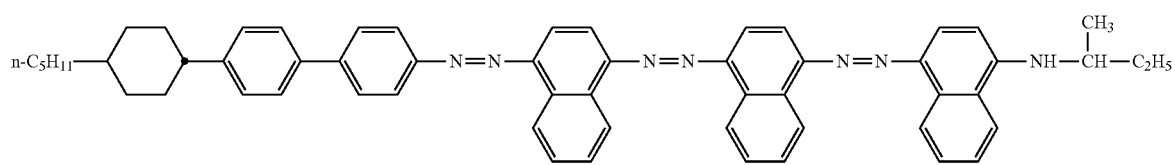

F593

3) Examples of Devices According to the Invention and Their Switching Windows

The table below shows the results of combinations of media 1 to 8 with the different substrate materials ITO and glass in the devices according to the invention. For each device, the switching window, i.e. the range between boundary states A and B, is indicated in degrees Celsius.

| | Substrate material | | |
|---|---|---|---|
| Entry | ITO-ITO | ITO-Glass | Glass-Glass |
| 1 | — | — | 48° C.-60° C. |
| 2 | 34° C.-38° C. | — | — |
| 3 | 37° C.-41° C. | — | — |
| 4* | — | — | 48° C.-60° C. |
| 5 | −10° C.-8° C. | 15° C.-50° C. | — |
| 6 | 37° C.-41° C. | — | — |
| 7 | 40° C.-65° C. | 5° C.-50° C. | 10° C.-65° C. |
| 8 | 35° C.-$T_{NI}$ | | |

*Comparative example in a test cell provided with linear polarisers

4) Switching Process of the Devices According to the Invention

All working examples according to the present invention show a change in the transmission with temperature throughout their working range ("switching window").

FIG. 1 shows by way of example the switching process of a device containing medium according to entry 1 applying the substrate material combination is Glass/Glass (working principle for the temperature dependent Nematic-hometropic to Nematic-planar transition).

It can be seen that a gradual transition from high to low transmission with increasing temperature takes place within a working range of about 48 to about 60° C.

As a comparative example, entry 4 is depicted in the table. Entry 4 refers to the temperature dependent switching of medium 4 (no dichroic dyes) filled in a cell (Glass-Glass) which is provided with 2 linear polarizers (parallel alignment of the planes of polarization). By comparing the results of the switching with the working example according to entry 1, it can be seen that the same switching range is obtained with medium according to the present invention containing dichroic dyes. Accordingly, the presence of dichroic dyes as shown in entry 1 has no measurably effect on the switching process.

Figure 2:
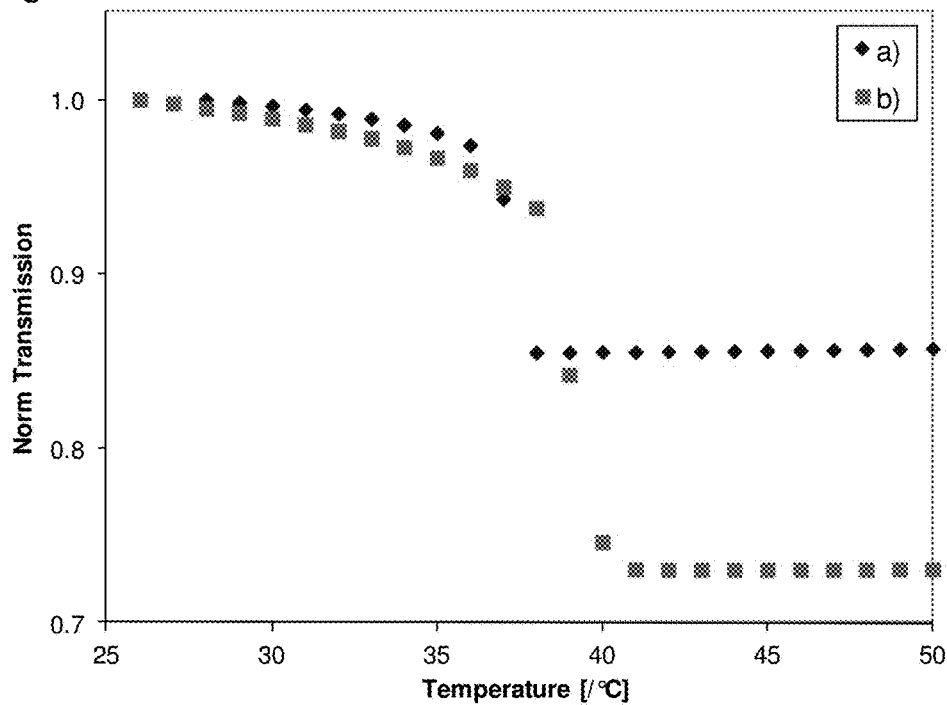
FIG. 2 shows the switching process of a cell containing the media according to entries 2 and 3 of the invention.

FIG. 2 shows the switching process of a cell containing the media according to entries 2 and 3 and the substrate material combination of ITO/ITO (working principle for the temperature dependent Nematic-homeotropic to isotropic transition).

It can be seen that a transition from high to low transmission takes place with increasing temperature in a working range from about 34 to about 38° C. (a: entry 2). For a higher amount of dichroic dye (b: entry 3), the transition is slightly shifted to higher temperature and the contrast (the ratio between the intensity of the bright and dark states) is almost doubled.

The invention claimed is:
1. A medium comprising:
one or more liquid-crystalline compounds,
one or more dichroic dyes, and
one or more silsequioxane compounds (A) having a molecular weight of greater than 450 Da, wherein each compound (A) is a silsequioxane compound bonded to one or more anchor groups of the formula A-1, or one or more organic compounds (B), wherein said one or more anchor groups bonded to (A) are each of the formula A-1,

*-E-[X$^{41}$—Z$^{41}$]$_a$—X$^{42}$  A-1, in which, in each case independently, E represents a single bond or a spacer group;

X$^{41}$ is selected from —NH—, —NR$^{41}$—, —O— and a single bond;

X$^{42}$ is selected from —NH$_2$, —NHR$^{41}$, NR$^{41}$$_2$, —OR$^{41}$ and —OH;

Z$^{41}$ is selected from an alkylene group having 1-15 C atoms, a carbocyclic ring group having 5 or 6 C atoms, or combinations of such groups, where the groups may in each case be substituted by OH, OR$^{41}$, —NH$_2$, —NHR$^{41}$, —NR$^{41}$$_2$ or halogen;

R$^{41}$ is selected on each occurrence, identically or differently, from H, D, or an aliphatic, aromatic and/or heteroaromatic organic group having 1 to 30 C atoms, in which, in addition, one or more H atoms may be replaced by D or F;

a is equal to 0, 1, 2 or 3, and

* marks the bonding site of the anchor group to the silsequioxane; and wherein organic compounds compound (B) are each of the formula B-I,

R$^{B1}$-A$^{B1}$-(Z$^{B1}$-A$^{B2}$)$_m$-R$^{B2}$  B-I, wherein,

A$^{B1}$ and A$^{B2}$ each, independently of one another, denote an aromatic, heteroaromatic, alicyclic or heterocyclic group, which may also contain fused rings, and which may also be mono- or polysubstituted by a group L, L in each case, independently of one another, denotes OH, (CH$_2$)$_n$—OH, F, Cl, Br, I, CN, —NO$_2$, —NCO, —NCS, OCN, SCN, —C(=O)N(R$^0$)$_2$, C(=O)R$^0$, —N(R$^0$)$_2$, —(CH$_2$)$_n$—N(R$^0$)$_2$, optionally substituted silyl, optionally substituted aryl or cycloalkyl having 6 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms are each optionally replaced by F or Cl, Z$^{B1}$ in each case, independently of one another, denotes —O—, S, —CO—, CO—O—, OCO—, —O—CO—O—, OCH$_2$—, CH$_2$O—, SCH$_2$, —CH$_2$S—, CF$_2$O—, OCF$_2$—, CF$_2$S—, —SCF$_2$—, (CH$_2$)$_n$—, CF$_2$CH$_2$—, CH$_2$CF$_2$—, (CF$_2$)$_n$—, CH=CH—, CF=CF—, C≡C—, CH=CH—COO—, OCO—CH=CH—, CR$^0$R$^{00}$ or a single bond, R$^0$ and R$^{00}$ each, independently of one another, denote H or alkyl having 1 to 12 C atoms, R$^{B1}$ denotes H, halogen, straight-chain, branched or cyclic alkyl having 1 to 25 C atoms, in which, in addition, one or more non-adjacent CH$_2$ groups are each optionally replaced by —NR$^0$—, —O—, —S—, —CO—, CO—O—, —O—CO—, or —O—CO—O— in such a way that N, O and/or S atoms are not linked directly to one another, and in which, in addition, one or more CH groups are each optionally replaced by N, and in which, in addition, one or more H atoms are each optionally replaced by F or Cl, R$^{B2}$ denotes, a straight-chain, branched or cyclic alkyl group or aryl group having 1 to 25 C atoms, in which, in addition, one or more non-adjacent CH$_2$ groups are each optionally replaced by —NR$^0$—, —O—, —S—, —CO—, —CO—O—, —O—CO—, or —O—CO—O— in such a way that N, O and/or S atoms are not linked directly to one another, and in which, in addition, one or more tertiary CH groups are each optionally replaced by N, and in which, in addition, one or more H atoms are each optionally replaced by F or Cl, with the proviso that the radical R$^{B2}$ contains one or more heteroatoms selected from N, S and/or O, m denotes 0, 1, 2, 3, 4 or 5, and n denotes 1, 2, 3 or 4.

2. The medium according to claim 1, wherein compound (A) has a diameter of 1 nm to 100 nm.

3. The medium according to claim 1, wherein group R$^{B2}$ is of the formula CG,

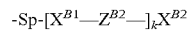

-Sp-[X$^{B1}$—Z$^{B2}$—]$_k$X$^{B2}$  CG wherein,

Sp denotes a spacer group or a single bond,

X$^{B1}$ in each case independently denotes —NH—, —NR$^0$—, —O— or a single bond, X$^{B2}$ denotes a group —NH$_2$, —NHR$^0$, —NR$^0$$_2$, —OR$^0$, —OH, —(CO)OH or a group of the formula

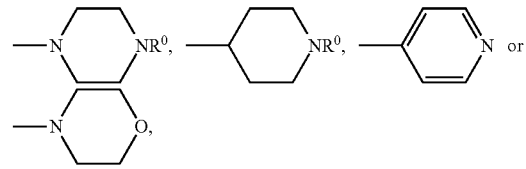

Z$^{B2}$ in each case independently denotes an alkylene group having 1-15 C atoms, a carbocyclic ring having 5 or 6 C atoms, or combinations of one or more rings and one or more alkylene groups, in each of which one or more H atoms are each optionally replaced by —OH, —OR$^0$, —(CO)OH, —NH$_2$, —NHR$^0$, —NR$^0$$_2$ or halogen, R$^0$ has in each occurrence, each and independently one of meanings as indicated under formula B-I, and k denotes 0, 1, 2 or 3.

4. The medium according to claim 1, wherein the dichroic dye is selected from perylene dyes, anthrachinone dyes, and azo dyes.

5. The medium according to claim 1, wherein the dichroic dye is selected from the compounds of formula I,

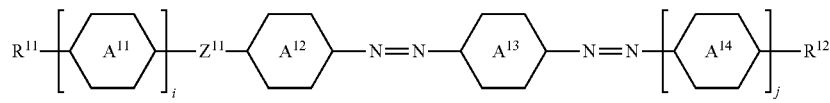

wherein,

to

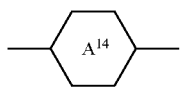

are at each occurrence, identically or differently, selected from

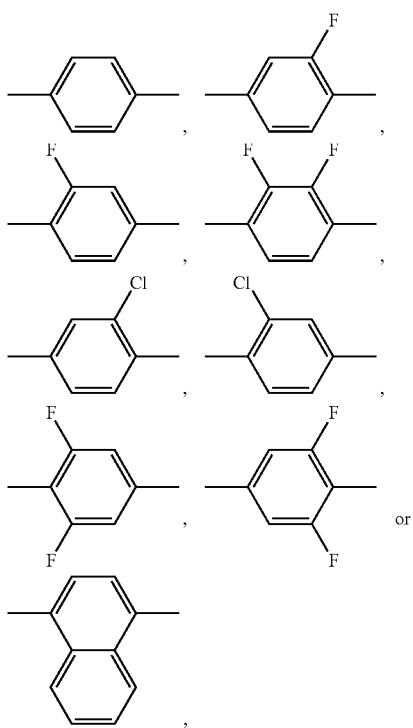

and, in case i is 2 or more, the terminal one of group

may also be

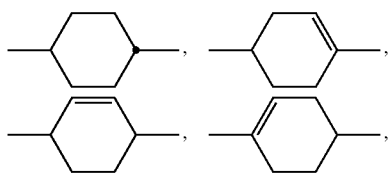

-continued

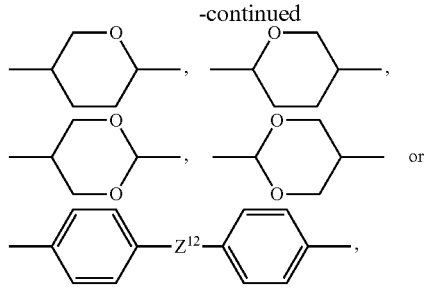

and in case j is 2 or more, the terminal one of group

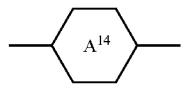

may also be

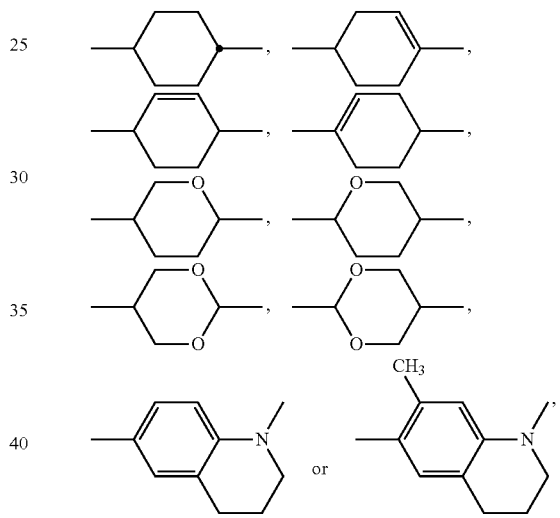

$Z^{11}$ and $Z^{12}$ are, independently of each other, —N═N—, —OCO— or —COO—, $R^{11}$ and $R^{12}$ are, independently of each other, alkyl, alkoxy, fluorinated alkyl or fluorinated alkoxy, alkenyl, alkenyloxy, alkoxyalkyl or fluorinated alkenyl, alkylaminyl, dialkylaminyl, alkylcarbonyl, alkyloxycarbonyl, alkylcarbonyloxy, alkyloxycarbonyloxy or alkylcyclohexylalkyl, and i and j are independently of each other 1, 2, 3 or 4.

6. The medium according to claim 1, wherein said one or more compounds (A) or said one or more compounds (B) are in a concentration between 0.5 and 10% by weight, with regards to the medium as a whole.

7. A process for the production of a medium according to claim 1, comprising mixing at least one liquid-crystalline compound, with at least one dichroic dye, and with at least one compound (A) or (B).

8. An electro-optical or temperature-reactive device comprising a layer of liquid crystalline medium according to claim 1, wherein said medium has a boundary state A and the liquid crystalline compounds in the layer of liquid crystalline medium in boundary state A are homeotropically aligned.

9. An electro-optical or temperature-reactive device, comprising a medium of claim 1.

10. A temperature-reactive device for regulation of light transmission comprising a layer of a medium according to claim 1.

11. The device according to claim 10, wherein the layer of the medium is arranged directly adjacent between two substrate layers.

12. The device according to claim 10, wherein the device comprises no alignment layers adjacent to the layer of the medium.

13. The device according to claim 10, wherein the device comprises no polarizers.

14. The device according to claim 10, wherein said medium has a boundary state A with a transmission $T_A$ at a temperature below a boundary temperature $\theta_A$ and a boundary state B with a transmission $T_B$ at a temperature above a boundary temperature $\theta_B$, whereby, $\theta_A < \theta_B$, and $T_A > T_B$.

15. The device according to claim 14, wherein the boundary temperature $\theta_A$ is between −20 and +30° C. and in that the boundary temperature $\theta_B$ is between 30 and 100° C.

16. The device according to claim 14, wherein the transition between the two boundary states A and B with increasing temperature and the transition between the two boundary states B and A with decreasing temperature proceeds gradually via intermediate values of the transmission T.

17. A method for the regulation of light entry and/or energy input into an interior wherein a device according to claim 10 regulates the light or energy input.

18. A process for the production of a device according to claim 10, comprising providing a layer of the medium onto a substrate layer.

19. The medium according to claim 1, wherein said medium contains one or more compounds (A) in the form of nanoparticles having a diameter between 1 nm and 1 μm.

20. The medium according to claim 1, wherein E is a single bond or a spacer group selected from an alkylene group having 1 to 20 C atoms, which is optionally substituted by substituents selected from F, Cl, Br, I and CN, and wherein one or more $CH_2$ groups in the alkylene group are each optionally replaced, independently of one another, by —O—, —S—, —NH—, —N($R^{41}$)—, —Si(($R^{41}$)$_2$)—, —CO—, —CO—O—, —O—CO—, —O—CO—O—, —S—CO—, —CO—S—, —N($R^{41}$)—CO—O—, —O—CO—N($R^{41}$)—, —N($R^{41}$)—CO—N($R^{41}$)—, —CH=CH— or —C≡C—.

21. The medium according to claim 1, wherein E is a single bond or a spacer group selected from —$(CH_2)_b$—, —$(CH_2)_b$—O—, —$(CH_2)_b$—O—CO— and —$(CH_2)_b$—O—CO—O—, where b represents an integer from 1 to 20.

22. The medium according to claim 1, wherein $R^{41}$ is an alkyl or alkoxy group having 1 to 15 C atoms, which is optionally substituted by D and/or halogen, or an alkenyl, alkynyl, alkenyloxy or alkynyloxy group having 2 to 15 C atoms, which is optionally substituted by D and/or halogen, or an aryl or heteroaryl group having 5 to 18 aromatic ring atoms, which is optionally substituted by D and/or halogen.

23. The medium according to claim 20, wherein $R^{41}$ is an alkyl or alkoxy group having 1 to 15 C atoms, which is optionally substituted by D and/or halogen, or an alkenyl, alkynyl, alkenyloxy or alkynyloxy group having 2 to 15 C atoms, which is optionally substituted by D and/or halogen, or an aryl or heteroaryl group having 5 to 18 aromatic ring atoms, which is optionally substituted by D and/or halogen.

24. The medium according to claim 1, wherein $R^{41}$ an alkyl or alkenyl group having at most 15 C atoms, which is optionally substituted by D, phenyl and/or halogen.

25. The medium according to claim 1, wherein said one or more anchor groups bonded to compound (A) are each of the formula A-2:

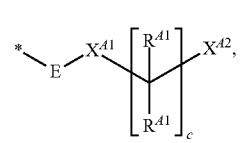

where E, $X^{41}$, $X^{42}$ and $R^{41}$ are as defined above and c has a value of 1 to 10.

26. The medium according to claim 1, wherein said one or more silsequioxane compounds (A) are selected from the following compounds:

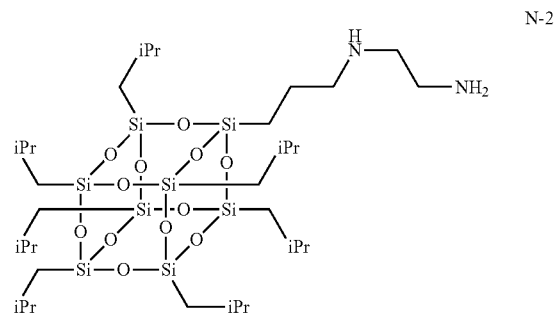

N-2

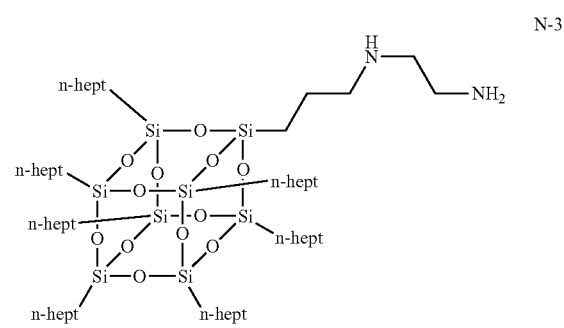

N-3

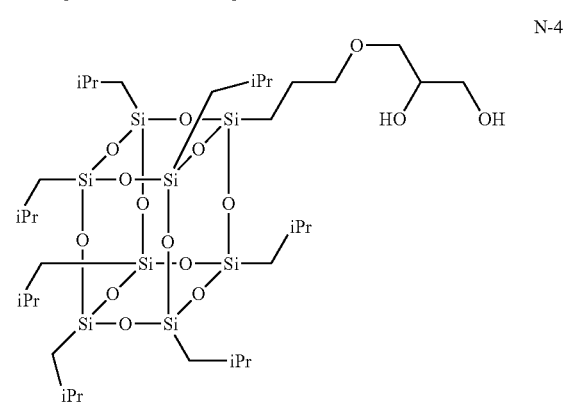

N-4

N-5
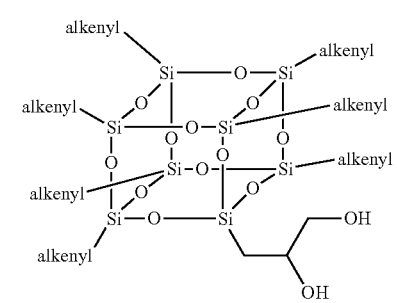
N-6
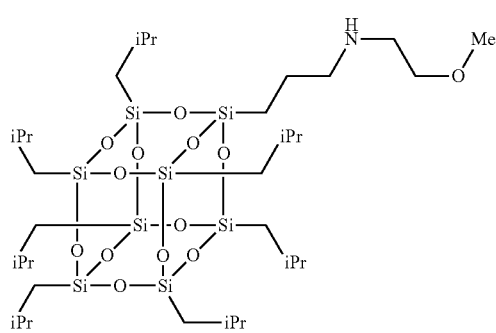
N-7
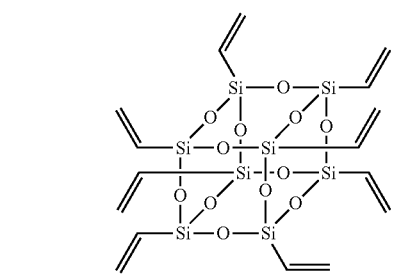
N-8
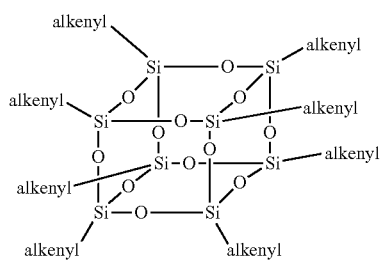
N-9
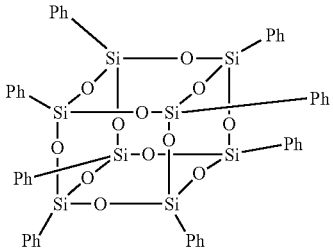
where iPr is isopropyl, n-hept is n-heptyl, Me is methyl, alkenyl is
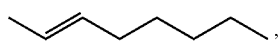,
and Ph is phenyl.
27. The medium according to claim 1, wherein group $R^{B2}$ is of the formula CG-1,
$$\text{Sp-X}^{B3} \qquad \qquad \text{CG-I}$$
Sp denotes —$(CH_2)_p$—,
P denotes 0, 1 or 2 and
$X^{B3}$ denotes a group —$NH_2$, —SH, —OH, —(CO)OH or a group of the formulae
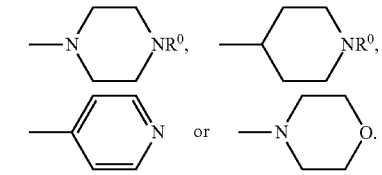
* * * * *